| (12) United States Patent<br>Donegan et al. | (10) Patent No.: US 9,826,720 B2<br>(45) Date of Patent: Nov. 28, 2017 |
|---|---|

(54) BIRD FEEDER HANGER DISPLAY

(71) Applicant: Classic Brands, LLC, Denver, CO (US)

(72) Inventors: Robert W. Donegan, Denver, CO (US); Bryan Krueger, Denver, CO (US); Jennifer Ouimette, Morrison, CO (US)

(73) Assignee: Classic Brands, LLC, Denver, CO (US)

( * ) Notice: Subject to any disclaimer, the term of this patent is extended or adjusted under 35 U.S.C. 154(b) by 112 days.

(21) Appl. No.: 14/702,469

(22) Filed: May 1, 2015

(65) Prior Publication Data

US 2016/0316724 A1 Nov. 3, 2016

(51) Int. Cl.
*A01K 39/00* (2006.01)
*A01K 39/012* (2006.01)

(52) U.S. Cl.
CPC .................................. *A01K 39/012* (2013.01)

(58) Field of Classification Search
CPC ...... A01K 39/00; A01K 39/012; A01K 39/01; A01K 39/02; A01K 39/0206; A01K 39/04; A01K 31/00; A01K 31/06; A01K 31/07; A01K 31/08; A01K 31/12
USPC .......... 119/61.57, 61.56, 464, 467, 468, 469, 119/470, 57.8, 52.2, 72, 74, 51.5, 52.1
See application file for complete search history.

(56) References Cited

U.S. PATENT DOCUMENTS

| 15,982 | A | 10/1856 | Moulton |
| D3,585 | S | 7/1869 | Brown |
| D4,451 | S | 11/1870 | Pitts |
| 117,807 | A | 8/1871 | Orndorff |
| D7,964 | S | 12/1874 | Morse |
| D8,908 | S | 1/1876 | Wiley |
| D17,296 | S | 5/1887 | Putnam et al. |
| D20,059 | S | 7/1890 | Irwin |
| D22,607 | S | 7/1893 | Johnes |
| 502,559 | A | 8/1893 | Gilman |

(Continued)

FOREIGN PATENT DOCUMENTS

GB 2269305 A 4/1992

OTHER PUBLICATIONS

More Birds Bird Feeders & Nectar 2013 Product Catalog (12 pages).

(Continued)

*Primary Examiner* — Trinh Nguyen
(74) *Attorney, Agent, or Firm* — Polsinelli PC

(57) ABSTRACT

Implementations described and claimed herein provide an aesthetically pleasing bird feeder hanger display. In one implementation, a bird feeder comprises a bottle, a display insert, and a hanger. The bottle has a transparent, elongated body extending from a proximal end to a distal end. The proximal end is configured to attach to a cap, and the distal end is configured to attach to a basin. The display insert is sized and configured to extend along a length of the bottle in the interior from the cap to the basin. The display insert has a rigid, planar surface with a proximal tab and a distal tab defined therein. The hanger has a proximal hook and a distal hook. To display the hanger through the transparent, elongated body of the bottle, the proximal hook is configured to engage the proximal tab, and the distal hook is configured to engage the distal tab.

9 Claims, 49 Drawing Sheets

(56) References Cited

U.S. PATENT DOCUMENTS

| | | |
|---|---|---|
| D24,947 S | 12/1895 | Feeney et al. |
| D28,734 S | 5/1898 | Muller |
| 632,167 A | 8/1899 | Biesmeyer |
| D34,318 S | 4/1901 | Juhring |
| 721,435 A | 2/1903 | Fielding |
| 727,597 A | 5/1903 | Day |
| D36,459 S | 7/1903 | Brosi |
| 813,954 A | 2/1906 | Davis |
| D39,701 S | 12/1908 | Watkins |
| 954,968 A | 4/1910 | Jacoy |
| 1,010,543 A | 12/1911 | Walter et al. |
| 1,023,240 A | 4/1912 | Bowier |
| D43,781 S | 4/1913 | Sanford |
| 1,091,392 A | 3/1914 | Schlichtinger |
| 1,107,206 A | 8/1914 | Schwartzburg |
| 1,136,092 A | 4/1915 | Blumere |
| 1,148,873 A | 8/1915 | Stocking |
| 1,181,045 A | 4/1916 | Tessier |
| 1,251,935 A | 1/1918 | Stevens |
| 1,265,481 A | 5/1918 | Mosby |
| 1,377,111 A | 5/1921 | Blair |
| 1,377,684 A | 5/1921 | Hollands |
| 1,391,231 A | 9/1921 | Wilson |
| 1,391,353 A | 9/1921 | Wells |
| 1,408,410 A | 2/1922 | Sidle |
| 1,410,128 A | 3/1922 | Sands |
| 1,423,547 A | 7/1922 | Strohbach |
| 1,426,508 A | 8/1922 | Rollins |
| 1,428,475 A | 9/1922 | Coolidge |
| 1,434,831 A | 11/1922 | Long |
| D62,888 S | 8/1923 | Davis, Jr. et al. |
| D62,916 S | 8/1923 | Peck |
| 1,472,667 A | 10/1923 | Nelson |
| D64,637 S | 5/1924 | Mas |
| D65,772 S | 10/1924 | Caltis |
| 1,517,164 A | 11/1924 | Lear |
| 1,521,782 A | 1/1925 | Meier |
| 1,538,480 A | 5/1925 | Gallagher |
| 1,547,762 A | 7/1925 | Kohlman, Jr. |
| 1,555,407 A | 9/1925 | Ferris |
| 1,557,068 A | 10/1925 | Lee |
| 1,566,571 A | 12/1925 | Appleton |
| D69,462 S | 2/1926 | Sears |
| D71,107 S | 9/1926 | Gorowitz |
| 1,622,975 A | 3/1927 | Rozic |
| 1,623,439 A | 4/1927 | Rawlings |
| 1,634,569 A | 7/1927 | Bray |
| 1,634,648 A | 7/1927 | Cardinet |
| 1,644,063 A | 10/1927 | Kircher |
| D76,001 S | 8/1928 | Broch |
| 1,682,575 A | 8/1928 | Leon et al. |
| D76,544 S | 10/1928 | Kleis |
| 1,698,915 A | 1/1929 | Kircher |
| 1,707,528 A | 4/1929 | La Bombard |
| D81,439 S | 6/1930 | Frank |
| D81,602 S | 7/1930 | Teague |
| D81,960 S | 9/1930 | Dickson |
| D84,104 S | 5/1931 | Rithner |
| 1,858,087 A | 5/1932 | Howard |
| 1,864,200 A | 6/1932 | Kaufmann |
| 1,894,406 A | 1/1933 | Lenhart |
| 1,905,856 A | 4/1933 | Haase et al. |
| D90,120 S | 6/1933 | McNash |
| 1,919,916 A | 7/1933 | Taylor |
| D95,019 S | 4/1935 | Cooperstein |
| 2,000,609 A | 5/1935 | Pitman |
| D100,112 S | 6/1936 | Mcintosh |
| D101,483 S | 10/1936 | Mott |
| D102,532 S | 12/1936 | Vuillemenot |
| D105,812 S | 8/1937 | Siekert |
| D111,229 S | 9/1938 | Spence |
| D112,632 S | 12/1938 | Berkowitz |
| D115,321 S | 6/1939 | Pueschel |
| 2,172,789 A | 9/1939 | Desper |
| 2,193,492 A | 3/1940 | Richardson |
| D121,675 S | 7/1940 | Goldin |
| D126,997 S | 5/1941 | Bentzen et al. |
| D130,923 S | 12/1941 | Philipovich |
| 2,267,883 A | 12/1941 | Wood |
| D132,522 S | 5/1942 | Fuerst et al. |
| 2,298,398 A | 10/1942 | Marshaus |
| 2,350,922 A | 6/1944 | Planeta |
| D140,392 S | 2/1945 | Haynes |
| 2,432,632 A | 12/1947 | Seibel |
| D149,729 S | 5/1948 | Arnek |
| D150,490 S | 8/1948 | Brown |
| D153,759 S | 5/1949 | Blatt |
| 2,475,207 A | 7/1949 | Smith |
| D158,279 S | 4/1950 | Heflter-Louiche |
| 2,570,733 A | 10/1951 | Thomas |
| D165,628 S | 1/1952 | Blazier |
| D166,418 S | 4/1952 | Sandkuhle |
| 2,641,086 A | 6/1953 | Stephen |
| 2,652,027 A | 9/1953 | Coyner |
| D173,658 S | 12/1954 | Jones |
| 2,696,803 A | 12/1954 | Deffenbaugh |
| D174,139 S | 3/1955 | Sadler |
| D174,909 S | 6/1955 | Kllegberg |
| D175,435 S | 8/1955 | Moffat |
| 2,725,663 A | 12/1955 | Mullen |
| D178,917 S | 10/1956 | England et al. |
| D179,507 S | 1/1957 | Barbiers |
| 2,778,398 A | 1/1957 | Edwards |
| 2,801,611 A | 8/1957 | Decker |
| 2,802,304 A | 8/1957 | Hille |
| D185,557 S | 6/1959 | Mas |
| 2,891,508 A | 6/1959 | Bower |
| D186,085 S | 9/1959 | Dallas |
| 2,971,671 A | 2/1961 | Shakman |
| D190,668 S | 6/1961 | Bliss |
| D192,435 S | 3/1962 | Goodman |
| 3,050,619 A | 8/1962 | Abramson |
| 3,051,303 A | 8/1962 | Daanen et al. |
| D194,846 S | 3/1963 | Perry |
| 3,089,605 A | 5/1963 | Buonauro |
| 3,090,354 A | 5/1963 | Merritt et al. |
| D196,777 S | 11/1963 | Haynes |
| 3,125,069 A | 3/1964 | Fowler |
| D197,905 S | 4/1964 | Friedman et al. |
| 3,136,296 A | 6/1964 | Luin |
| D200,472 S | 3/1965 | Chang |
| 3,244,150 A | 4/1966 | Blair |
| D205,772 S | 9/1966 | Blair |
| 3,272,467 A | 9/1966 | Kassube |
| 3,307,602 A | 3/1967 | Boster |
| 3,329,321 A | 7/1967 | Moore |
| 3,372,676 A | 3/1968 | Williams |
| D212,276 S | 9/1968 | Lodding et al. |
| 3,402,871 A | 9/1968 | Palmer |
| D214,172 S | 5/1969 | Troutman |
| D216,361 S | 12/1969 | Pappas, Jr. |
| 3,491,724 A | 1/1970 | Virginia |
| D217,470 S | 5/1970 | Morrow |
| 3,526,335 A | 9/1970 | Swett et al. |
| 3,634,678 A | 1/1972 | Glass et al. |
| 3,661,122 A | 5/1972 | Willauer, Jr. |
| D230,295 S | 2/1974 | Rosenwach |
| D230,948 S | 3/1974 | Moon |
| 3,798,826 A | 3/1974 | Ferguson |
| D234,180 S | 1/1975 | Dart et al. |
| D234,615 S | 3/1975 | Kilham |
| D235,908 S | 7/1975 | Rosenwatch |
| D236,139 S | 7/1975 | Kilham |
| 3,901,192 A | 8/1975 | Adams |
| 3,913,527 A | 10/1975 | Kilham |
| 3,928,936 A | 12/1975 | Wollen |
| D239,182 S | 3/1976 | Kilham |
| D241,149 S | 8/1976 | Miller et al. |
| 3,979,854 A | 9/1976 | Perkins |
| D241,860 S | 10/1976 | Calamia |
| 3,997,999 A | 12/1976 | Evans |
| D244,009 S | 4/1977 | Kayne |
| D244,098 S | 4/1977 | Kilham |
| D244,786 S | 6/1977 | Dryden |

(56) References Cited

U.S. PATENT DOCUMENTS

| | | |
|---|---|---|
| 4,030,451 A | 6/1977 | Miller |
| 4,037,361 A | 7/1977 | Murphy et al. |
| D246,294 S | 11/1977 | Hetherington |
| 4,082,872 A | 4/1978 | Hughes |
| 4,085,706 A | 4/1978 | Evans |
| D248,006 S | 5/1978 | Christian |
| 4,096,947 A | 6/1978 | Morse |
| 4,102,308 A | 7/1978 | Kilham |
| 4,144,842 A | 3/1979 | Schlising |
| D252,288 S | 7/1979 | Kilham |
| D253,706 S | 12/1979 | Bardeau |
| 4,206,529 A | 6/1980 | Neumann |
| D258,338 S | 2/1981 | Gersin |
| D258,566 S | 3/1981 | Potter |
| D258,570 S | 3/1981 | Pettengill |
| D259,763 S | 7/1981 | Dickinson |
| D260,184 S | 8/1981 | Whatley |
| D260,608 S | 9/1981 | McKee, Jr. |
| D260,830 S | 9/1981 | Trouba |
| D260,843 S | 9/1981 | Laird et al. |
| D264,434 S | 5/1982 | Pettengill |
| 4,327,669 A | 5/1982 | Blasbalg |
| D264,812 S | 6/1982 | O'Toole |
| D264,813 S | 6/1982 | Potter |
| D265,939 S | 8/1982 | Kilham |
| D266,611 S | 10/1982 | Metts et al. |
| 4,361,116 A | 11/1982 | Kilham |
| D267,355 S | 12/1982 | Blasbalg |
| 4,369,216 A | 1/1983 | Willinger |
| D268,056 S | 2/1983 | Campbell-Kelly et al. |
| 4,395,015 A | 7/1983 | Reardon |
| D271,434 S | 11/1983 | Love |
| D272,507 S | 2/1984 | Conti |
| D272,508 S | 2/1984 | Conti |
| D273,429 S | 4/1984 | Kilham |
| 4,441,458 A | 4/1984 | Mercil |
| 4,444,324 A | 4/1984 | Grenell |
| D276,891 S | 12/1984 | Fortuna |
| D277,514 S | 2/1985 | Bescherer |
| D277,703 S | 2/1985 | Kilham |
| D277,988 S | 3/1985 | Kilham |
| 4,506,657 A | 3/1985 | Trolle |
| D278,751 S | 5/1985 | Seager |
| 4,516,533 A | 5/1985 | Mallinson |
| D279,456 S | 7/1985 | Fortuna |
| D280,559 S | 9/1985 | Bentall |
| D280,700 S | 9/1985 | Martin et al. |
| D281,768 S | 12/1985 | Hansen, Jr. |
| D282,019 S | 12/1985 | Kilham |
| D284,033 S | 5/1986 | Brodsky |
| 4,588,618 A | 5/1986 | Wolfe |
| D284,167 S | 6/1986 | Goettner |
| D285,840 S | 9/1986 | Poon |
| D287,647 S | 1/1987 | Ringle |
| D287,652 S | 1/1987 | Mack |
| D288,353 S | 2/1987 | Smith |
| 4,651,791 A | 3/1987 | Evenson |
| D289,143 S | 4/1987 | Guillaume |
| 4,664,066 A | 5/1987 | Steuernagel et al. |
| D290,773 S | 7/1987 | Liethen |
| D291,656 S | 9/1987 | Bussell |
| 4,691,665 A | 9/1987 | Hefner |
| D292,372 S | 10/1987 | Sykes |
| 4,702,198 A | 10/1987 | Holyoak |
| 4,708,892 A | 11/1987 | Young et al. |
| 4,712,512 A | 12/1987 | Schreib et al. |
| D293,823 S | 1/1988 | Fieschi et al. |
| D294,050 S | 2/1988 | Zinter-Chahin |
| 4,732,112 A | 3/1988 | Fenner et al. |
| D297,297 S | 8/1988 | Lacey |
| D299,015 S | 12/1988 | Seymour |
| D299,105 S | 12/1988 | Sun |
| 4,789,572 A | 12/1988 | Weaver |
| D299,770 S | 2/1989 | Coffer |
| 4,803,954 A | 2/1989 | Welch et al. |
| D304,536 S | 11/1989 | Blaser |
| D304,811 S | 11/1989 | Thurman |
| 4,896,628 A | 1/1990 | Kadunce |
| 4,901,673 A | 2/1990 | Overstreet |
| D309,261 S | 7/1990 | Weckman |
| D309,639 S | 7/1990 | Knudsen |
| D309,640 S | 7/1990 | Knudsen |
| 4,938,168 A | 7/1990 | Meidell |
| D309,858 S | 8/1990 | Meyersburg |
| D314,253 S | 1/1991 | Goetz |
| 4,980,990 A | 1/1991 | Hiday |
| 4,995,526 A | 2/1991 | Garrison |
| 4,996,947 A | 3/1991 | Petrides |
| 5,016,791 A | 5/1991 | Burow |
| 5,031,575 A | 7/1991 | Phillips |
| 5,033,411 A | 7/1991 | Brucker |
| D318,887 S | 8/1991 | Laib |
| D319,268 S | 8/1991 | Laib |
| D319,389 S | 8/1991 | Halm |
| 5,040,698 A | 8/1991 | Ramsey et al. |
| D321,382 S | 11/1991 | Laib |
| 5,062,390 A | 11/1991 | Bescherer et al. |
| D322,044 S | 12/1991 | Marsar et al. |
| 5,083,881 A | 1/1992 | Yoshinaga |
| 5,088,615 A | 2/1992 | Neuman |
| D324,436 S | 3/1992 | Embree |
| 5,101,996 A | 4/1992 | Mosley |
| D326,003 S | 5/1992 | Embree |
| D326,411 S | 5/1992 | Wefler |
| 5,140,945 A | 8/1992 | Barnhart et al. |
| D329,892 S | 9/1992 | Brister |
| D330,676 S | 11/1992 | Halasz et al. |
| D331,647 S | 12/1992 | Embree |
| D331,864 S | 12/1992 | Sciubba |
| D332,750 S | 1/1993 | Moloney et al. |
| D333,065 S | 2/1993 | Murphy |
| D333,538 S | 2/1993 | Kingsley |
| 5,183,005 A | 2/1993 | Tyler |
| 5,195,463 A | 3/1993 | Lorenzana et al. |
| D334,635 S | 4/1993 | Wenstrand |
| D335,006 S | 4/1993 | Blasbalg |
| 5,207,180 A | 5/1993 | Graham |
| 5,215,040 A | 6/1993 | Lemley |
| 5,215,210 A | 6/1993 | Ostrum et al. |
| D337,271 S | 7/1993 | Pezzoli et al. |
| D337,614 S | 7/1993 | Turner |
| D338,317 S | 8/1993 | Woodward |
| D338,614 S | 8/1993 | Pierce |
| D338,615 S | 8/1993 | Magidson et al. |
| 5,247,904 A | 9/1993 | Anderson |
| 5,253,609 A | 10/1993 | Partelow et al. |
| 5,261,558 A | 11/1993 | Claydon |
| D343,030 S | 1/1994 | Harwick, Jr. |
| D344,390 S | 2/1994 | May et al. |
| D345,444 S | 3/1994 | Kestekides-Kesdekoglu |
| 5,289,796 A | 3/1994 | Armstrong |
| 5,291,855 A | 3/1994 | Laverty |
| D346,745 S | 5/1994 | Heynen et al. |
| D347,172 S | 5/1994 | Heynen et al. |
| D347,714 S | 6/1994 | Maple et al. |
| D350,047 S | 8/1994 | Kiyokane |
| D353,250 S | 12/1994 | Skalka |
| D356,265 S | 3/1995 | Moloney et al. |
| 5,396,878 A | 3/1995 | Quist |
| D357,778 S | 4/1995 | Dalgarno |
| D358,547 S | 5/1995 | Darr |
| D359,708 S | 6/1995 | Boscato |
| D360,710 S | 7/1995 | Colwell |
| D360,829 S | 8/1995 | Leeds |
| D362,089 S | 9/1995 | Moore et al. |
| 5,450,816 A | 9/1995 | Santa Cruz |
| D365,411 S | 12/1995 | Yan |
| D366,413 S | 1/1996 | Tober |
| 5,479,879 A | 1/1996 | Biek |
| D367,614 S | 3/1996 | Pagarani |
| D368,337 S | 3/1996 | Dickinson |
| D368,347 S | 3/1996 | Kruger |
| D368,989 S | 4/1996 | Prehart |
| 5,507,249 A | 4/1996 | Shaw |

(56) References Cited

U.S. PATENT DOCUMENTS

| | | |
|---|---|---|
| D370,313 S | 5/1996 | Nottingham et al. |
| D370,634 S | 6/1996 | Mero et al. |
| 5,522,758 A | 6/1996 | Liu |
| D371,401 S | 7/1996 | Nielsen et al. |
| D371,838 S | 7/1996 | Davis et al. |
| 5,564,226 A | 10/1996 | Paramest |
| D376,035 S | 11/1996 | Boucheron |
| D376,453 S | 12/1996 | Park |
| D376,731 S | 12/1996 | Lin |
| D378,055 S | 2/1997 | Waldon et al. |
| D378,312 S | 3/1997 | Davis, Jr. |
| 5,638,638 A | 6/1997 | Moskowitz |
| D382,376 S | 8/1997 | Bescherer |
| 5,655,477 A | 8/1997 | Hoffman et al. |
| D385,067 S | 10/1997 | Whittles |
| 5,678,600 A | 10/1997 | Locke et al. |
| D386,116 S | 11/1997 | Sanderson |
| D386,811 S | 11/1997 | Milicia |
| D386,835 S | 11/1997 | Passamare |
| D386,836 S | 11/1997 | Hunt |
| 5,682,835 A | 11/1997 | Walter |
| D387,156 S | 12/1997 | Johnson |
| D388,235 S | 12/1997 | Wilson et al. |
| D392,763 S | 3/1998 | Denison |
| 5,722,344 A | 3/1998 | Rank |
| D394,468 S | 5/1998 | Leadbetter |
| D395,840 S | 7/1998 | Cato |
| 5,782,200 A | 7/1998 | Knowles et al. |
| D397,529 S | 8/1998 | Fuller et al. |
| 5,800,047 A | 9/1998 | Yang |
| 5,806,460 A | 9/1998 | Klein |
| D399,611 S | 10/1998 | Ericson et al. |
| D400,106 S | 10/1998 | Anderson et al. |
| 5,816,686 A | 10/1998 | Wang et al. |
| 5,823,135 A | 10/1998 | Gilchrist et al. |
| D401,475 S | 11/1998 | Ritchey |
| 5,845,605 A | 12/1998 | Malamphy |
| 5,848,493 A | 12/1998 | Gasper |
| D406,307 S | 3/1999 | Kang |
| 5,881,671 A | 3/1999 | Riedl |
| D408,420 S | 4/1999 | Buter |
| D410,096 S | 5/1999 | Majerowski |
| 5,899,355 A | 5/1999 | Claydon et al. |
| 5,899,555 A | 5/1999 | Lin |
| D410,592 S | 6/1999 | Niemiec |
| D412,226 S | 7/1999 | Bellehumeur |
| 5,918,415 A | 7/1999 | Locke et al. |
| D413,406 S | 8/1999 | Hsu |
| 5,947,054 A | 9/1999 | Liethen |
| D417,326 S | 11/1999 | Greene |
| D417,528 S | 12/1999 | Rizzo |
| 6,012,414 A | 1/2000 | Klein |
| D420,284 S | 2/2000 | Sagel |
| D421,393 S | 3/2000 | Pavely et al. |
| D421,643 S | 3/2000 | Mauk |
| D423,166 S | 4/2000 | Hornyak |
| D423,722 S | 4/2000 | Lang |
| D425,259 S | 5/2000 | Lang |
| 6,067,934 A | 5/2000 | Harwich |
| 6,079,361 A | 6/2000 | Bowell et al. |
| D428,757 S | 8/2000 | Loffler et al. |
| D429,852 S | 8/2000 | Hogarty |
| D431,760 S | 10/2000 | Sullivan |
| D433,633 S | 11/2000 | La Fata |
| D433,747 S | 11/2000 | Frampton |
| 6,145,477 A | 11/2000 | Jansen |
| D434,980 S | 12/2000 | Suziki |
| D435,219 S | 12/2000 | Williams et al. |
| D435,688 S | 12/2000 | Johnson |
| 6,167,840 B1 | 1/2001 | White et al. |
| D438,360 S | 2/2001 | Robinson |
| D440,002 S | 4/2001 | Miranda |
| D440,361 S | 4/2001 | Colwell |
| D440,677 S | 4/2001 | Long et al. |
| 6,213,054 B1 | 4/2001 | Marshall |
| D443,711 S | 6/2001 | Lindsay |
| D445,525 S | 7/2001 | Pan |
| D445,533 S | 7/2001 | Arnoldo |
| D445,939 S | 7/2001 | Pan |
| 6,253,707 B1 | 7/2001 | Cote |
| 6,269,774 B1 | 8/2001 | Stewart |
| D447,957 S | 9/2001 | Lichtman et al. |
| D448,290 S | 9/2001 | Schultz et al. |
| D449,204 S | 10/2001 | Groll |
| D450,786 S | 11/2001 | Jenkins et al. |
| D451,237 S | 11/2001 | Dolan |
| D451,997 S | 12/2001 | Schwartz |
| D452,748 S | 1/2002 | Dolan |
| D454,192 S | 3/2002 | Frampton |
| D454,636 S | 3/2002 | Lantz |
| D454,669 S | 3/2002 | Lieb |
| 6,360,690 B1 | 3/2002 | Canby |
| D455,599 S | 4/2002 | Cheng |
| D455,961 S | 4/2002 | Edson et al. |
| D459,824 S | 7/2002 | Leen |
| D460,591 S | 7/2002 | Skalka |
| D460,592 S | 7/2002 | Skalka |
| D461,827 S | 8/2002 | Koebbe |
| D461,939 S | 8/2002 | Skalka |
| 6,427,629 B1 | 8/2002 | Lush |
| 6,439,158 B1 | 8/2002 | Blohm |
| D463,046 S | 9/2002 | Kumar |
| D464,184 S | 10/2002 | Skalka |
| D464,781 S | 10/2002 | Skalka |
| 6,463,878 B1 | 10/2002 | Moody |
| D465,892 S | 11/2002 | Weiss et al. |
| D466,255 S | 11/2002 | Kuelbs |
| D466,656 S | 12/2002 | Kuelbs et al. |
| D466,664 S | 12/2002 | Hsu |
| 6,499,430 B2 | 12/2002 | Garcia-Lucio et al. |
| D469,360 S | 1/2003 | Moore et al. |
| D470,621 S | 2/2003 | Cheng |
| D470,630 S | 2/2003 | Kuelbs |
| D471,092 S | 3/2003 | Thorne et al. |
| D471,093 S | 3/2003 | Thorne et al. |
| D471,096 S | 3/2003 | Thorne et al. |
| D471,327 S | 3/2003 | Kuelbs |
| D473,739 S | 4/2003 | Lenger |
| 6,543,384 B2 | 4/2003 | Cote |
| 6,546,894 B2 | 4/2003 | Chrisco et al. |
| D476,179 S | 6/2003 | Lenger |
| D476,755 S | 7/2003 | LoVullo et al. |
| D477,778 S | 7/2003 | Dretzka |
| 6,591,781 B2 | 7/2003 | Hardison |
| D478,475 S | 8/2003 | Backes et al. |
| D479,595 S | 9/2003 | Curtin |
| D479,596 S | 9/2003 | Curtin |
| D479,597 S | 9/2003 | Curtin |
| D480,135 S | 9/2003 | Frampton |
| D480,802 S | 10/2003 | Frampton |
| D480,803 S | 10/2003 | Frampton |
| D482,562 S | 11/2003 | Demers |
| D482,736 S | 11/2003 | Manville |
| D483,529 S | 12/2003 | Fort, II |
| D483,537 S | 12/2003 | Skalka |
| D483,858 S | 12/2003 | Lin |
| 6,659,041 B1 | 12/2003 | Curts |
| 6,662,747 B1 | 12/2003 | Wydra |
| D485,068 S | 1/2004 | Opiniano |
| D485,208 S | 1/2004 | Fan |
| D485,345 S | 1/2004 | Bucher |
| D485,350 S | 1/2004 | Frampton |
| D485,351 S | 1/2004 | Frampton |
| D485,387 S | 1/2004 | Harbaugh |
| D485,928 S | 1/2004 | Leung et al. |
| 6,672,249 B2 | 1/2004 | Garcia-Lucio et al. |
| D487,177 S | 2/2004 | Skalka |
| D488,195 S | 4/2004 | Manville |
| D488,219 S | 4/2004 | Frampton |
| D488,901 S | 4/2004 | Skalka |
| D489,128 S | 4/2004 | Frampton |
| D489,940 S | 5/2004 | Gluck |
| D490,192 S | 5/2004 | Markusen et al. |
| 6,733,151 B2 | 5/2004 | Shu |

(56) References Cited

U.S. PATENT DOCUMENTS

| | | |
|---|---|---|
| D490,745 S | 6/2004 | Fan |
| D491,019 S | 6/2004 | Marsden et al. |
| D491,657 S | 6/2004 | Cartwright |
| D491,696 S | 6/2004 | Cole |
| D492,601 S | 7/2004 | Ogata et al. |
| D493,053 S | 7/2004 | Snell |
| D493,358 S | 7/2004 | Graves et al. |
| 6,776,511 B1 | 8/2004 | Lindsay |
| D495,839 S | 9/2004 | Muday et al. |
| D495,900 S | 9/2004 | Mayse |
| 6,792,891 B1 | 9/2004 | Coburn et al. |
| D497,406 S | 10/2004 | King |
| D497,458 S | 10/2004 | Nauert |
| D501,805 S | 2/2005 | Opiniano |
| D502,293 S | 2/2005 | Harger |
| D502,294 S | 2/2005 | Hung |
| D503,019 S | 3/2005 | Swift et al. |
| 6,860,229 B1 | 3/2005 | Craft |
| 6,861,108 B1 | 3/2005 | Potoroka, Sr. |
| 6,866,004 B1 | 3/2005 | Lush |
| D504,746 S | 5/2005 | Lee |
| D504,987 S | 5/2005 | Morris, Sr. |
| D505,521 S | 5/2005 | Schrodt |
| D505,755 S | 5/2005 | Lundstrom et al. |
| 6,890,155 B2 | 5/2005 | Cartwright |
| D506,826 S | 6/2005 | Frampton |
| D509,325 S | 9/2005 | Jung et al. |
| D509,748 S | 9/2005 | Carmichael et al. |
| D509,749 S | 9/2005 | Shun |
| 6,945,192 B2 | 9/2005 | Cote |
| D510,992 S | 10/2005 | Bucher |
| D511,074 S | 11/2005 | Claypool et al. |
| D512,315 S | 12/2005 | Holm |
| D513,188 S | 12/2005 | Bertrand |
| 6,986,322 B2 | 1/2006 | Lumpkin et al. |
| D514,749 S | 2/2006 | Fort et al. |
| D515,455 S | 2/2006 | Opiniano |
| D515,916 S | 2/2006 | Bleuer |
| D516,462 S | 3/2006 | Opiniano |
| D516,712 S | 3/2006 | Pickett |
| D516,946 S | 3/2006 | Opiniano |
| D518,380 S | 4/2006 | Moran |
| D518,382 S | 4/2006 | McGuinness |
| 7,032,538 B1 | 4/2006 | Lush |
| D521,194 S | 5/2006 | Weiland |
| 7,040,251 B2 | 5/2006 | Fort, II |
| D522,816 S | 6/2006 | Schuler |
| D522,873 S | 6/2006 | Forget |
| D523,141 S | 6/2006 | Massey |
| D523,774 S | 6/2006 | Opiniano |
| D523,955 S | 6/2006 | Badarello |
| D524,164 S | 7/2006 | Goda |
| D524,490 S | 7/2006 | Obenshain |
| D525,560 S | 7/2006 | Opiniano |
| D525,903 S | 8/2006 | Weiser et al. |
| 7,093,562 B2 | 8/2006 | Smothers |
| 7,096,821 B2 | 8/2006 | Ruff |
| D528,464 S | 9/2006 | Opiniano |
| D528,940 S | 9/2006 | Espejo |
| D529,220 S | 9/2006 | Izardel |
| D530,444 S | 10/2006 | Girard |
| D530,457 S | 10/2006 | Jung et al. |
| D532,132 S | 11/2006 | Holsinger et al. |
| D536,838 S | 2/2007 | Colvin et al. |
| D538,485 S | 3/2007 | Degironne |
| D538,583 S | 3/2007 | Schuler |
| 7,185,605 B1 | 3/2007 | Lush |
| D539,991 S | 4/2007 | Petrie et al. |
| D540,349 S | 4/2007 | Waki |
| D541,466 S | 4/2007 | Bucher et al. |
| D542,479 S | 5/2007 | O'Dell |
| D542,591 S | 5/2007 | Carlson |
| D542,659 S | 5/2007 | Meether et al. |
| D542,993 S | 5/2007 | Skalka |
| D543,256 S | 5/2007 | Chen |
| D543,665 S | 5/2007 | Hewitt et al. |
| D544,942 S | 6/2007 | Chen |
| 7,234,416 B2 | 6/2007 | Hoff |
| 7,234,418 B2 | 6/2007 | Fort et al. |
| D545,984 S | 7/2007 | Leung et al. |
| D546,991 S | 7/2007 | Poon |
| D548,321 S | 8/2007 | Orozco |
| D548,525 S | 8/2007 | Gibbons et al. |
| 7,258,075 B1 | 8/2007 | Jones et al. |
| 7,261,055 B2 | 8/2007 | Nock |
| D551,986 S | 10/2007 | Rubin et al. |
| D553,821 S | 10/2007 | Skalka |
| D554,252 S | 10/2007 | Bucher et al. |
| 7,287,486 B2 | 10/2007 | Hunter |
| D558,419 S | 12/2007 | Zychlinski |
| D559,472 S | 1/2008 | Abinanti et al. |
| D561,021 S | 2/2008 | DuVal et al. |
| D561,040 S | 2/2008 | Sequeira |
| D561,967 S | 2/2008 | Skalka |
| D563,608 S | 3/2008 | Kitchen |
| D563,616 S | 3/2008 | Lynde et al. |
| D565,173 S | 3/2008 | Bucher et al. |
| D567,098 S | 4/2008 | Sequeira |
| D568,754 S | 5/2008 | Sequeira |
| D569,301 S | 5/2008 | Fotherby |
| 7,373,901 B2 | 5/2008 | Baynard |
| D571,056 S | 6/2008 | Bloedorn |
| D572,067 S | 7/2008 | Opiniano |
| D572,145 S | 7/2008 | Knapp et al. |
| D572,866 S | 7/2008 | Bloedorn |
| D573,769 S | 7/2008 | Skalka |
| 7,396,212 B1 | 7/2008 | Parker et al. |
| D575,118 S | 8/2008 | Bignon |
| D575,591 S | 8/2008 | Bonetti |
| D575,864 S | 8/2008 | Parker et al. |
| 7,409,922 B1 | 8/2008 | Baynard et al. |
| D576,497 S | 9/2008 | Ozer |
| 7,418,923 B1 | 9/2008 | Banyas et al. |
| D581,193 S | 11/2008 | Ghiorghie |
| 7,448,346 B1 | 11/2008 | Stone et al. |
| 7,448,347 B2 | 11/2008 | Richmond |
| D583,187 S | 12/2008 | Rapaz |
| D584,387 S | 1/2009 | Lee et al. |
| D584,954 S | 1/2009 | Pagliacci |
| D585,625 S | 1/2009 | Gray |
| D586,228 S | 2/2009 | McWillis |
| 7,484,475 B2 | 2/2009 | Milliner |
| D587,941 S | 3/2009 | Singh |
| D588,756 S | 3/2009 | Colvin et al. |
| 7,503,282 B1 | 3/2009 | Lush |
| 7,506,611 B1 | 3/2009 | Lush |
| 7,516,716 B2 | 4/2009 | Puckett et al. |
| D591,589 S | 5/2009 | Myers et al. |
| D592,046 S | 5/2009 | Myers et al. |
| D593,649 S | 6/2009 | Marvell |
| D595,525 S | 7/2009 | Dimond |
| D596,033 S | 7/2009 | Zach et al. |
| D597,197 S | 7/2009 | Parker et al. |
| D598,238 S | 8/2009 | Durdon et al. |
| D599,159 S | 9/2009 | Stein |
| D599,899 S | 9/2009 | Thompson |
| D600,861 S | 9/2009 | Sin |
| D601,309 S | 9/2009 | Babal |
| 7,600,487 B2 | 10/2009 | Stone et al. |
| D604,436 S | 11/2009 | Poon |
| D606,369 S | 12/2009 | Ruzycky |
| D606,447 S | 12/2009 | West et al. |
| D606,708 S | 12/2009 | McMullen |
| D606,709 S | 12/2009 | McMullen |
| D606,878 S | 12/2009 | Lindfors |
| D607,612 S | 1/2010 | Yang |
| D609,329 S | 2/2010 | Parker et al. |
| D609,864 S | 2/2010 | Tsai |
| 7,654,225 B2 | 2/2010 | Madsen et al. |
| D612,549 S | 3/2010 | Garcia-Lucio et al. |
| 7,685,969 B2 | 3/2010 | Stone et al. |
| D614,825 S | 4/2010 | Biegel |
| D615,310 S | 5/2010 | Cybulski |
| 7,721,676 B2 | 5/2010 | Bloedorn |

(56) References Cited

U.S. PATENT DOCUMENTS

| | | |
|---|---|---|
| D618,733 S | 6/2010 | Kessler |
| 7,743,732 B2 | 6/2010 | Webber |
| D620,172 S | 7/2010 | Orozco |
| D623,005 S | 9/2010 | Cheng |
| D623,806 S | 9/2010 | Modi et al. |
| D624,352 S | 9/2010 | Lion et al. |
| 7,789,040 B2 | 9/2010 | Liethen |
| D627,457 S | 11/2010 | Klausing et al. |
| 7,827,936 B1 | 11/2010 | Puckett et al. |
| D629,137 S | 12/2010 | Chen |
| D630,969 S | 1/2011 | Mattis |
| D631,149 S | 1/2011 | Fis-Menache |
| 7,861,671 B2 | 1/2011 | Carter et al. |
| 7,874,264 B2 | 1/2011 | McMullen |
| 7,886,695 B2 | 2/2011 | Held et al. |
| D633,659 S | 3/2011 | Lai |
| D636,238 S | 4/2011 | Elmelund |
| D636,539 S | 4/2011 | Montoya |
| D636,945 S | 4/2011 | Anderson |
| D636,946 S | 4/2011 | Able |
| D637,448 S | 5/2011 | Cheng |
| 7,946,248 B2 | 5/2011 | Colwell et al. |
| 7,946,249 B2 | 5/2011 | Colvin et al. |
| 7,946,734 B2 | 5/2011 | Laporte |
| 7,958,845 B2 | 6/2011 | Gardner |
| D641,261 S | 7/2011 | Diss et al. |
| D641,516 S | 7/2011 | Chen |
| D643,442 S | 8/2011 | Sato et al. |
| D643,855 S | 8/2011 | Taniguchi et al. |
| D644,052 S | 8/2011 | Kraemer |
| 7,997,434 B2 | 8/2011 | Benetti |
| 8,006,946 B2 | 8/2011 | Bonnema |
| D644,469 S | 9/2011 | Kraemer |
| 8,011,323 B2 | 9/2011 | Vaughn et al. |
| D648,492 S | 11/2011 | Able |
| D649,299 S | 11/2011 | Lush |
| D649,302 S | 11/2011 | Hickok |
| D649,471 S | 11/2011 | Guglielmo et al. |
| 8,051,803 B2 | 11/2011 | Gauker et al. |
| D650,514 S | 12/2011 | Lin et al. |
| D650,690 S | 12/2011 | Guglielmo et al. |
| D652,059 S | 1/2012 | Sato et al. |
| D652,343 S | 1/2012 | Hunter et al. |
| D652,742 S | 1/2012 | Diss |
| D652,972 S | 1/2012 | Lee |
| D653,011 S | 1/2012 | Myers |
| D653,124 S | 1/2012 | Diss |
| D653,562 S | 2/2012 | Ziegler et al. |
| D653,563 S | 2/2012 | Ziegler et al. |
| D656,279 S | 3/2012 | Tu |
| D656,690 S | 3/2012 | Tu |
| D657,399 S | 4/2012 | Nemoto |
| D658,684 S | 5/2012 | Roman |
| D658,930 S | 5/2012 | Munari |
| D662,652 S | 6/2012 | Browder |
| D664,437 S | 7/2012 | Barel |
| 8,230,809 B2 | 7/2012 | Cote |
| D665,627 S | 8/2012 | De Winter |
| 8,272,607 B2 | 9/2012 | Bonnema |
| D670,042 S | 10/2012 | Anderson |
| 8,276,541 B2 | 10/2012 | LoRocco et al. |
| D670,836 S | 11/2012 | Hisey et al. |
| D671,276 S | 11/2012 | Krueger |
| D671,692 S | 11/2012 | Carter |
| 8,316,800 B2 | 11/2012 | Puckett et al. |
| D673,722 S | 1/2013 | Cartwright |
| D673,727 S | 1/2013 | Cartwright |
| 8,360,005 B1 | 1/2013 | Allen |
| D677,574 S | 3/2013 | Barnard et al. |
| D677,575 S | 3/2013 | Barnard et al. |
| D678,628 S | 3/2013 | Krueger |
| D679,453 S | 4/2013 | Krueger et al. |
| D682,481 S | 5/2013 | Krueger |
| D682,482 S | 5/2013 | Nelson |
| D683,510 S | 5/2013 | Schick |
| D683,909 S | 6/2013 | Muhr et al. |
| D685,603 S | 7/2013 | Mishan |
| D689,730 S | 9/2013 | Goto et al. |
| D692,191 S | 10/2013 | Stephens et al. |
| D693,182 S | 11/2013 | Katterheinrich |
| 8,584,894 B1 | 11/2013 | Mulvaney et al. |
| D698,098 S | 1/2014 | Muhr et al. |
| D698,100 S | 1/2014 | Muhr et al. |
| D704,385 S | 5/2014 | Hoofman |
| D704,902 S | 5/2014 | Wu |
| D707,401 S | 6/2014 | Chen |
| D709,317 S | 7/2014 | Cheng |
| D709,330 S | 7/2014 | Holmes |
| D710,686 S | 8/2014 | Gowens |
| D711,679 S | 8/2014 | Day et al. |
| D713,101 S | 9/2014 | Bruno |
| D715,091 S | 10/2014 | Thun et al. |
| D715,092 S | 10/2014 | Thun et al. |
| D715,588 S | 10/2014 | Thun et al. |
| D717,200 S | 11/2014 | Thuma et al. |
| D717,201 S | 11/2014 | Thuma et al. |
| 8,899,179 B1 | 12/2014 | Carter et al. |
| D721,208 S | 1/2015 | Chen |
| D723,757 S | 3/2015 | Lentine |
| D728,035 S | 4/2015 | Kneller |
| D743,137 S | 11/2015 | Vasilakes |
| D748,880 S | 2/2016 | Lentine |
| 2002/0121246 A1 | 9/2002 | Harman |
| 2003/0033985 A1 | 2/2003 | Hardison |
| 2003/0226514 A1 | 12/2003 | Cote |
| 2004/0010971 A1 | 1/2004 | Redfield et al. |
| 2004/0074397 A1 | 4/2004 | Calhoun |
| 2004/0118354 A1 | 6/2004 | Cox et al. |
| 2004/0134437 A1 | 7/2004 | Fort |
| 2004/0261726 A1 | 12/2004 | Lumpkin |
| 2005/0120967 A1 | 6/2005 | Ruff |
| 2005/0127074 A1 | 6/2005 | Kusuma et al. |
| 2006/0005774 A1 | 1/2006 | Newman Bornhofen |
| 2006/0065202 A1 | 3/2006 | Fort et al. |
| 2006/0090391 A1 | 5/2006 | Huang |
| 2006/0090707 A1 | 5/2006 | Donegan |
| 2006/0096545 A1 | 5/2006 | Cone et al. |
| 2006/0117962 A1 | 6/2006 | Hoekstra et al. |
| 2006/0124067 A1 | 6/2006 | Taylor |
| 2006/0225658 A1 | 10/2006 | Baynard |
| 2006/0236591 A1 | 10/2006 | Cwiklinski et al. |
| 2007/0006813 A1 | 1/2007 | Smothers |
| 2007/0108197 A1 | 5/2007 | Richardson et al. |
| 2007/0221133 A1 | 9/2007 | Richmond |
| 2008/0006212 A1 | 1/2008 | Ebert |
| 2008/0035068 A1 | 2/2008 | Gou |
| 2008/0134979 A1 | 6/2008 | Crocker |
| 2008/0244959 A1 | 10/2008 | Schinazi et al. |
| 2008/0257273 A1 | 10/2008 | Carter et al. |
| 2008/0302304 A1 | 12/2008 | Mayfield |
| 2009/0056633 A1 | 3/2009 | McDaniel et al. |
| 2009/0056636 A1 | 3/2009 | Deese et al. |
| 2009/0078211 A1 | 3/2009 | Charlton |
| 2009/0145875 A1 | 6/2009 | Gardner |
| 2009/0229528 A1 | 9/2009 | McMurtry |
| 2009/0260576 A1* | 10/2009 | Vosbikian ............ A01K 39/012 119/52.2 |
| 2009/0283044 A1* | 11/2009 | Black .................. A01K 39/012 119/51.01 |
| 2009/0304876 A1 | 12/2009 | Weiss |
| 2009/0308321 A1 | 12/2009 | Szczygiel-Durante |
| 2009/0320765 A1 | 12/2009 | Gauker et al. |
| 2010/0024738 A1 | 2/2010 | Chen et al. |
| 2010/0170447 A1 | 7/2010 | Pridgen, Jr. |
| 2010/0180828 A1 | 7/2010 | DeMichael |
| 2010/0218754 A1 | 9/2010 | Kuntz |
| 2010/0224132 A1 | 9/2010 | Gauker |
| 2010/0242848 A1 | 9/2010 | Vaughn, Jr. |
| 2011/0100300 A1* | 5/2011 | Carter ................ A01K 39/0206 119/72 |
| 2011/0126771 A1* | 6/2011 | Cote ................ A01K 39/0113 119/52.3 |
| 2011/0297095 A1 | 12/2011 | Cruz |
| 2012/0216750 A1 | 8/2012 | Cruz |

(56) References Cited

U.S. PATENT DOCUMENTS

| | | | |
|---|---|---|---|
| 2012/0285387 A1* | 11/2012 | Humphries | A01K 39/0206 |
| | | | 119/53 |
| 2012/0311919 A1 | 12/2012 | Hardigree | |
| 2013/0042815 A1* | 2/2013 | Colvin | A01K 39/024 |
| | | | 119/78 |
| 2013/0284102 A1 | 10/2013 | McCune | |
| 2013/0284103 A1* | 10/2013 | Colvin | A01K 39/024 |
| | | | 119/78 |
| 2013/0291802 A1 | 11/2013 | Carpentieri | |
| 2014/0352621 A1 | 12/2014 | Fairbanks | |
| 2015/0122186 A1* | 5/2015 | Donegan | A01K 39/0113 |
| | | | 119/51.5 |

OTHER PUBLICATIONS

More Birds Bird Feeders & Nectar 2014 New Product Catalog Supplement (4 pages).
2013 Belle Fleur Wild Bird Products Catalog: Modern, Functional & Decorative Feeder Collection (16 pages).
2013 Stokes Select Bird Feeders & Accessories Products Catalog: The most complete collection of bird feeding products (46 pages).
Stokes New Products for 2014 Supplemental Products Catalog (4 pages).

\* cited by examiner

BIRD FEEDER HANGER DISPLAY

TECHNICAL FIELD

Aspects of the present disclosure relate to bird feeders and more particularly to the presentation of a hanger for the bird feeder during retail.

BACKGROUND

Many consumers choose bird feeders based on aesthetics. Conventionally, the aesthetics are diminished during presentation at a retail store due to storage of the hanger for the bird feeder prior to sale. Specifically, many bird feeders have a transparent bottle into which a hanger for the bird feeder is placed prior to sale. Because the bottles are often made of glass or similar material, the hanger may scratch the bottle. As such, the hangers are often covered in a protective wrap, such as plastic, and inserted into the bottle. The appearance of the wrapped hanger through the transparent bottle is considered unattractive to many consumers and frequently deters the consumers from purchasing the bird feeder. It is with these observations in mind, among others, that various aspects of the present disclosure were conceived and developed.

SUMMARY

Implementations described and claimed herein address the foregoing problems by providing an aesthetically pleasing bird feeder hanger display. In one implementation, a bird feeder comprises a bottle, a display insert, and a hanger. The bottle has a transparent, elongated body extending from a proximal end to a distal end. The proximal end is configured to attach to a cap, and the distal end is configured to attach to a basin. The bottle has an interior configured to hold bird food. The display insert is sized and configured to extend along a length of the bottle in the interior from the cap to the basin, and the display insert has a rigid, planar surface with a proximal tab and a distal tab defined therein. The hanger has a proximal hook and a distal hook. To display the hanger through the transparent, elongated body of the bottle, the proximal hook is configured to engage the proximal tab, and the distal hook is configured to engage the distal tab.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve an aesthetically pleasing bird feeder hanger display. In one aspect, the hanger display includes a display insert and a hanger. The display insert includes a surface and at least one tab. The hanger includes a rod and at least one hook configured to engage the tab of the display insert. The hanger display may be inserted through an opening into an interior of a bottle. The hanger display is displayed through a transparent wall of the bottle, thereby providing an aesthetically pleasing presentation of the bird feeder to consumers. Further, the display insert prevents the hanger from scratching or otherwise damaging the bottle during presentation or storage.

The presently disclosed technology generally provides for hanger displays. The implementations shown and discussed herein reference bird feeders. However, it will be appreciated by those skilled in the art that such implementations are exemplary only and not intended to be limiting and the presently disclosed technology is applicable to various consumer products.

Figure 1:
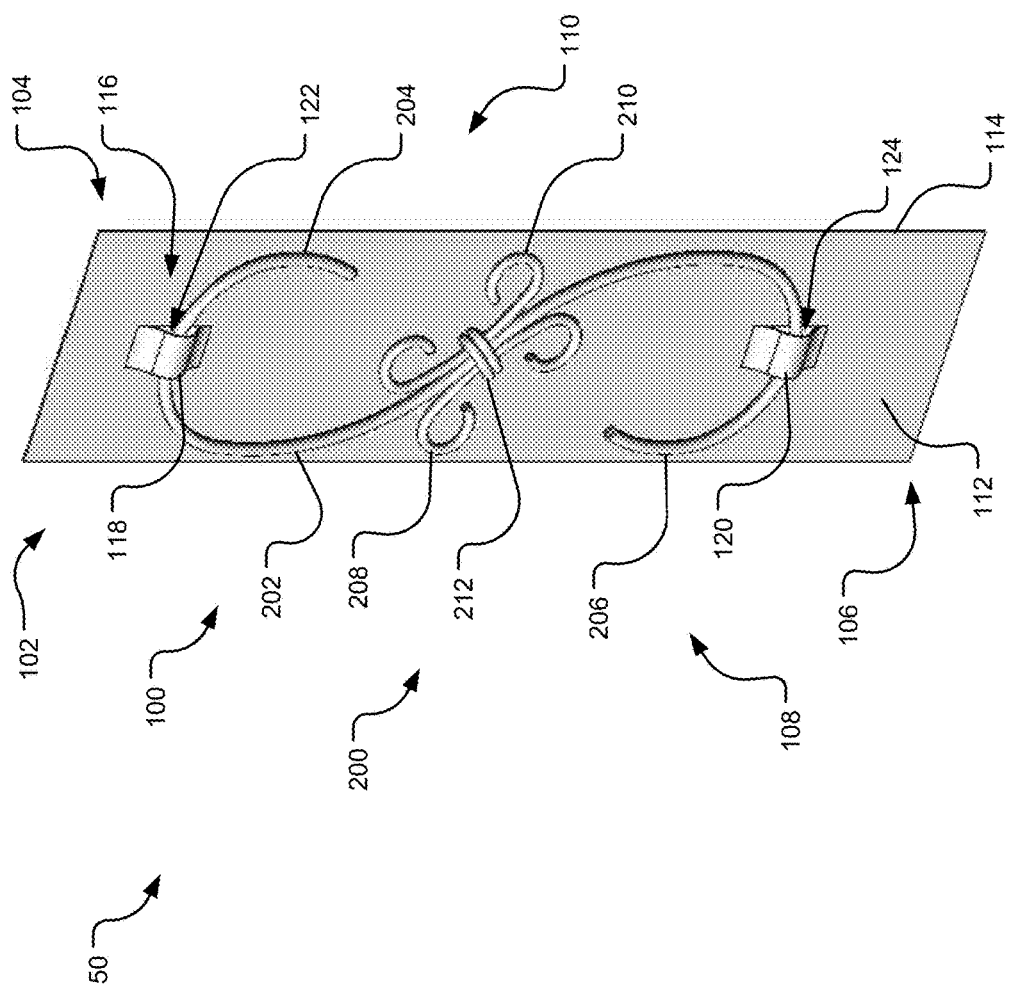
FIG. 1 shows an example hanger display for a bird feeder.
Figure 2:
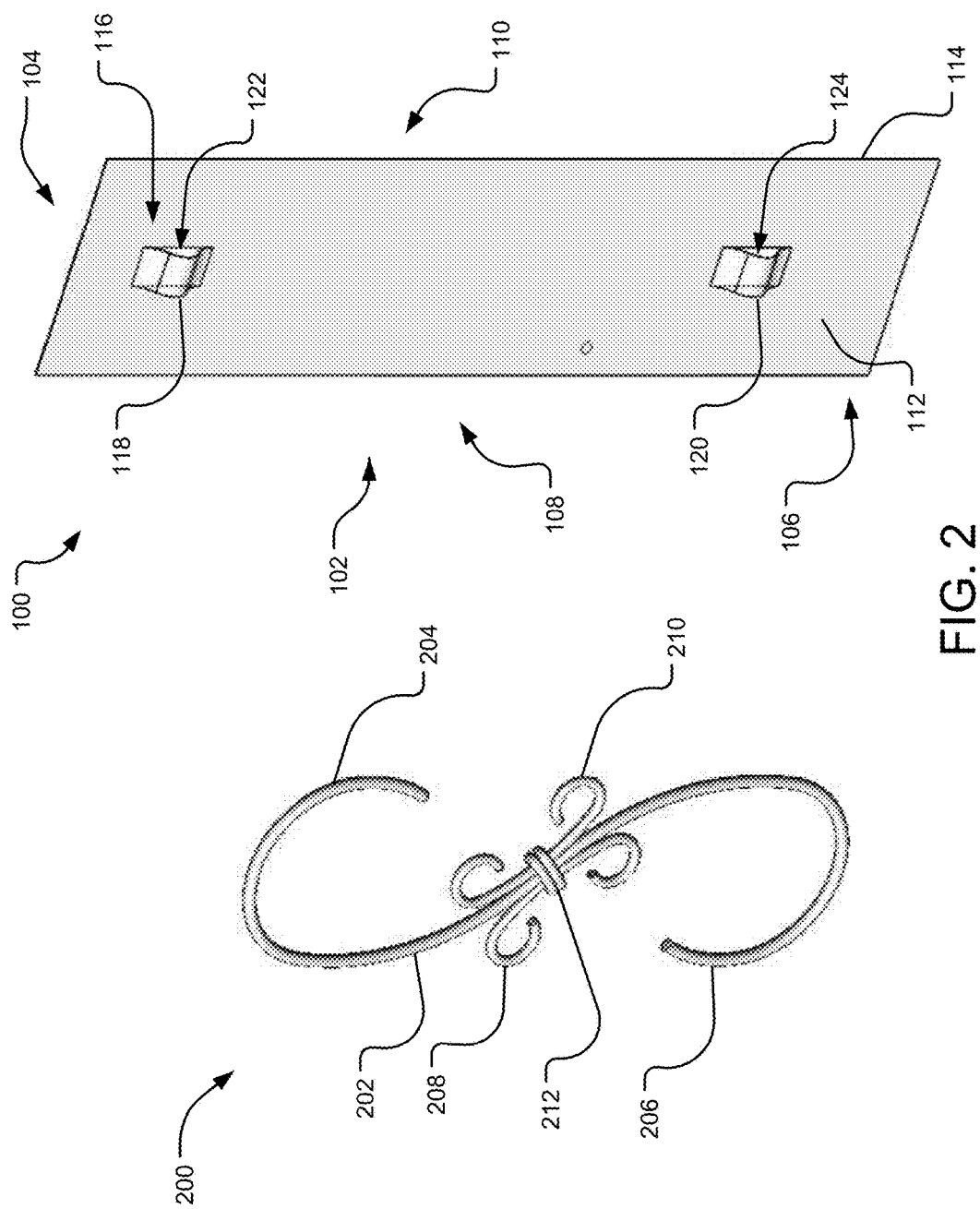
FIG. 2 is an exploded view of the hanger display.

For a detailed description of an example hanger display 50, reference is made to FIGS. 1-2, which show isometric and exploded views, respectively. In one implementation, the hanger display 50 includes a display insert 100 and a hanger 200.

The display insert 100 includes a frame 102 extending from a proximal end 104 to a distal end 106. In one implementation, the frame 102 includes a first face 108 opposite a second face 110. It will be appreciated that the frame 102 may be made from a variety of materials and include any number of faces to form various shapes, such as shape rectangular, triangular, circular, elliptical, trapezoidal, polygonal, or the like. The materials may include, without limitation, plastic, textiles, fabric, wood, ceramic, and/or other materials that are rigid enough to support the hanger 200 without scratching or otherwise damaging product features, such as a bottle 300 of a bird feeder, as described with respect to FIGS. 3-4. Moreover, the faces 108-110 may be transparent, translucent, opaque, and/or colored and may include designs, textures, and/or other decorative features. In some implementations, the hanger display 50 matches the decorative scheme of the bird feeder.

In one implementation, the first face 108 includes a surface 112, and the second face 110 includes a surface 114. However, any number of surfaces included in the first face 108 and/or the second face 110 is contemplated. The surfaces may be smooth, textured, planar, contoured, angled, and/or the like. In one implementation, the surfaces 112 and 114 are smooth, planar surfaces.

One or more of the surfaces 112 and 114 include at least one receiver 116 configured to removably engage a portion of the hanger 200. The receiver 116 may include various engaging features, including, without limitation, one or more notches, tabs, channels, apertures, indents, hooks, and/or the like.

In one implementation, a set of receivers 116 are disposed on the first face 108 extending from or otherwise defined in the surface 112. The set of receivers 116 includes a proximal tab 118 and a distal tab 120, each extending from the surface 112 to form a channel 122 and 124, respectively. The channels 122 and 124 are each configured to receive a portion of the hanger 200 to position and hold the hanger 200 against or otherwise near the surface 112 of the first face 108 of the display insert 100.

In other embodiments, the hanger 200 may be attached to the surface 112 through other ways. For example, the hanger 200 may be attached to the surface 112 using an adhesive, such as glue, tape, or other adhesive material. In another example, the hanger 200 may be attached to the surface 112 utilizing a type of fastener, such as a screw, a rivet, a nail, a loop fastener, and the like. Each of the attachments discussed may be configured to hold the hanger 200 against or otherwise near the surface 112, as shown.

The hanger 200 is configured to engage a proximal portion of a bird feeder to suspend the bird feeder from a structure, such as a tree or a pole. It will be appreciated by those of ordinary skill that the hanger 200 may have various configurations and features.

The hanger 200 includes an elongated body 202 extending from a proximal end to a distal end. The body 202 may extend linearly or have one or more contours or angles. Moreover, the body 202 may have different degrees of rigidity or flexibility. For example, the body 202 may be a wire or cable that is rigid enough to suspend a bird feeder but flexible enough to move, contort, collapse, and/or the like. As another example, the body 202 may be relatively rigid, such that the body 202 retains its shape and is not susceptible to contortion, as illustrated in FIGS. 1-2. The body 202 may be made from a variety of materials, including, but not limited to, metal, plastic, ceramic, wood, glass, and/or the like.

The hanger 200 includes a proximal hook 204 and a distal hook 206 extending from or otherwise connected to the body 202. In one implementation, the hooks 204 and 206 are formed from the body 202. To suspend a bird feeder, the proximal hook 204 is configured to engage a structure, and the distal hook 206 is configured to engage a portion of the bird feeder.

The hooks 204 and 206 may have a variety of shapes and sizes. For example, the hooks 204-206 may include one or more contours, angles, loops, and the like, and the hooks 204-206 may be substantially the same size or different sizes relative to each other. In the example shown in FIG. 1-2, the hooks 204-206 are the same size and have contours forming an opposite reflective shape of each of other. Specifically, the proximal hook 204 is formed by the body 202 extending proximally and curving in a first direction until reaching a proximal peak and curving back distally. Similarly, the distal hook 206 is formed by the body 202 extending distally and curving in a second direction, opposite the first direction, until reaching a distal peak and curving back proximally. In the example shown in FIGS. 1-2, the general shape formed by the body 202 and the hooks 204-206 is an "S-shape." However, other shapes are contemplated.

The hanger 200 may have a variety of decorative features. For example, the hanger may have a first decorative portion 210 mirroring a second decorative portion 212, which are held together with the body 202 using a decorative loop 212. The decorative features may be made from the same or different materials or aesthetics as the body 202, the hooks 204-206, the display insert 100, and/or the bird feeder.

In one implementation, a tip of the hook 204 is configured to be inserted through the channel 122 to engage the proximal tab 118 and the hook 206 is configured to be inserted through the channel 124 to engage the distal tab 120. The hanger display 50 may then be inserted into a bottle 300 for display.

Figure 3:
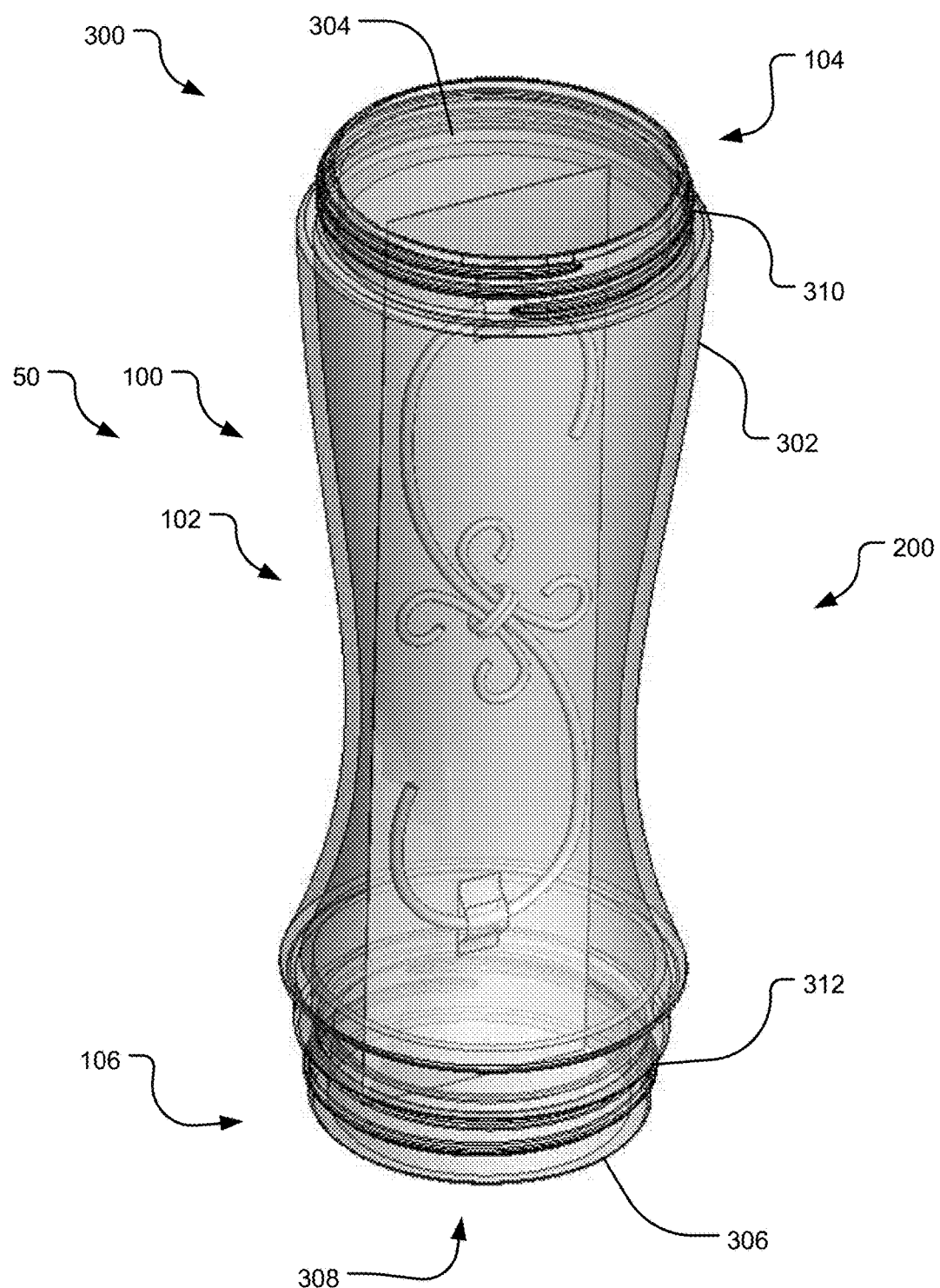
FIG. 3 illustrates an isometric view of the hanger display within an interior of an example bottle.
Figure 4:
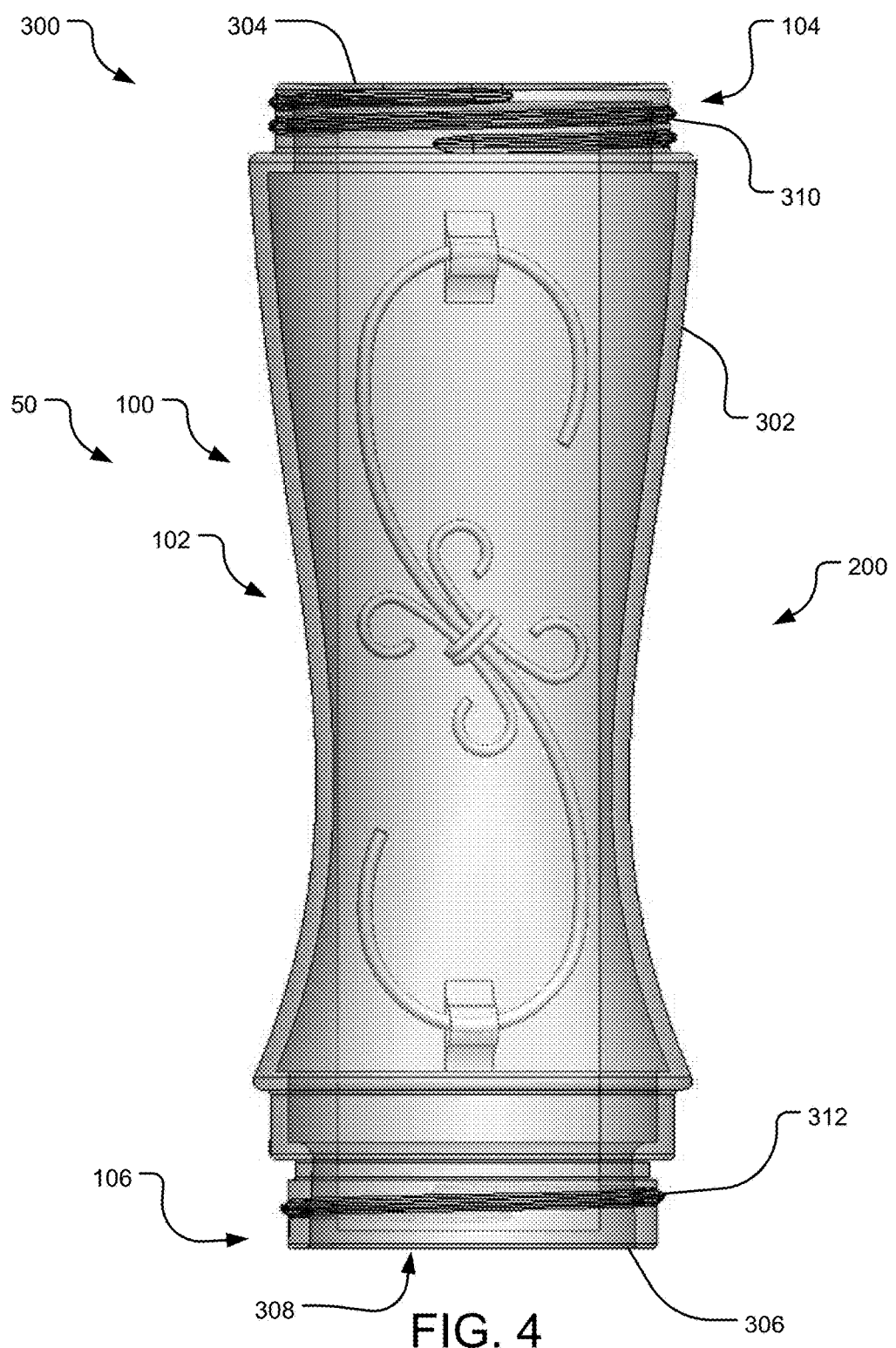
FIG. 4 is a front view of the bottle and hanger display of FIG. 3.

For a detailed description of the hanger display 50 disposed within an interior of an example bottle 300 for display, reference is made to FIGS. 3-4, which are isometric and front views, respectively.

The bottle 300 includes an elongated body 302 extending from a proximal end to a distal end. The bottle body 302 may have a variety of shapes and sizes, as illustrated in the examples shown in the Figures. The bottle body 302 may have one or more contours, angles, surfaces, textures, and/or the like. The bottle 300 may be made from a variety of materials, including, but not limited to, glass, plastic, metal, ceramic, wood, and the like. In one implementation, the bottle body 302 includes one or more transparent or translucent surfaces through which the hanger display 50 may be viewed.

In one implementation, the proximal end includes a surface 304, and the distal end includes a distal edge 306 defining an opening 308. The proximal surface 304 is a smooth, planar surface extending traverse to a length of the bottle body 302. The proximal end may include engaging features 310 to engage a cap (e.g., cap 502), and the distal end may include engaging features 312 configured to engage a basin (e.g., basin 400). In one implementation, the bottle body 302 is configured to hold bird food, such as nectar, and dispense the bird food through the distal opening 308 into a basin from which birds may access the bird food.

The hanger display 50 may be inserted proximally through the distal opening 308 into the interior of the bottle body 302 for display through the transparent or translucent surfaces of the bottle body 302. In one implementation, the hanger display 50 extends along the length of the bottle body 302 with the proximal end 104 of the display insert 100 disposed near the proximal surface 304 and the distal end 106 of the display insert 100 disposed near the distal opening 308. The display insert 100 prevents the hanger 200 from touching or otherwise from damaging the bottle body 302 of the bottle 300. In one implementation, the distal end 106 of the display insert 100 rests on a portion of a basin the position and orient the hanger display 50 within the interior of the bottle body 302.

Figure 5:
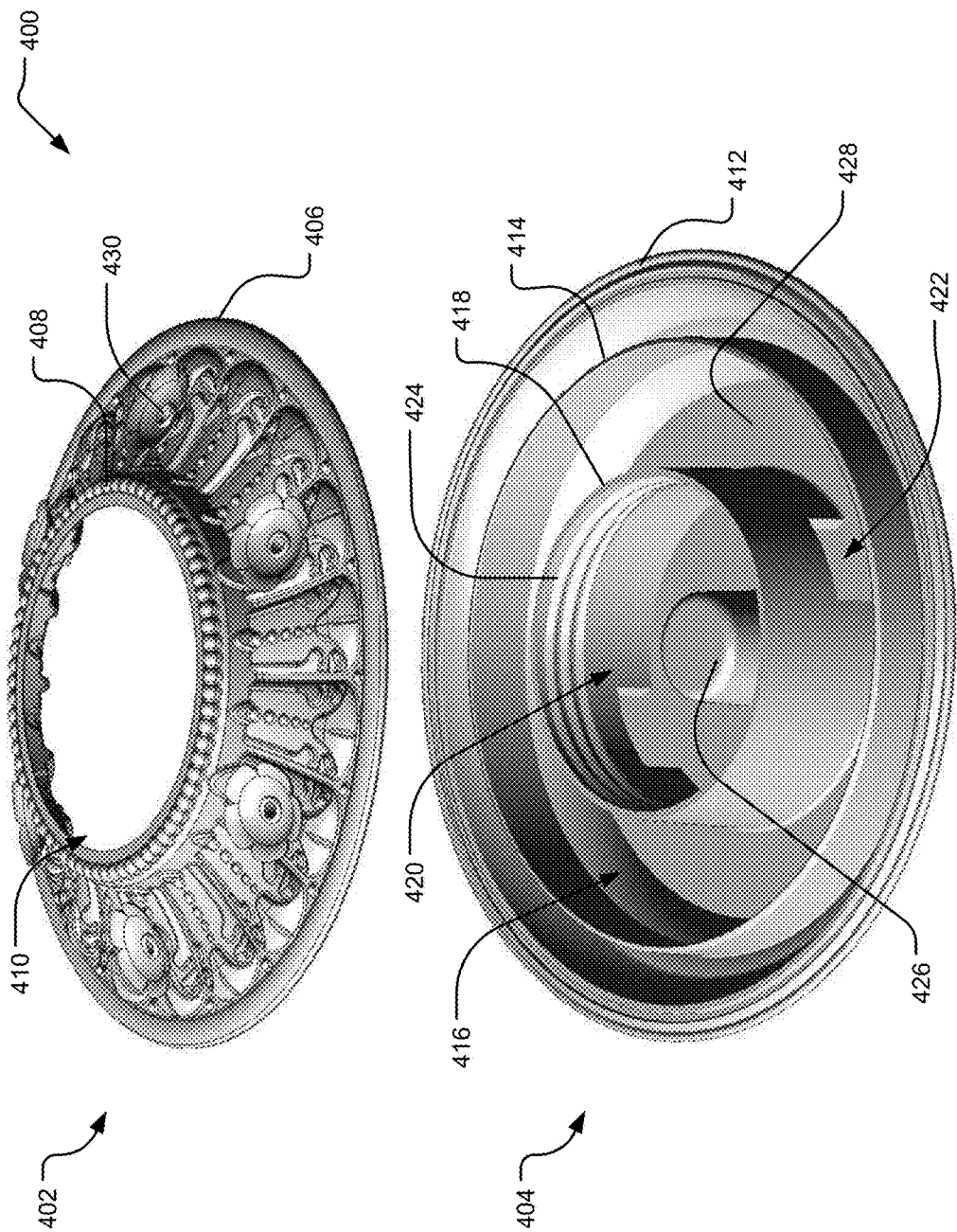
FIG. 5 shows an exploded view of an example basin.

Turning to FIG. 5, an exploded view of an example basin 400 is shown. In one implementation, the basin 400 includes a basin top 402 and a basin bottom 404.

The basin 400 is configured to engage the bottle 300 and dispense bird food. The basin 400 may be made from a variety of materials, including, without limitation, metal, glass, plastic, ceramic, wood, and/or the like. The basin top 402 and/or the basin bottom 404 may include various decorative features. In one implementation, the basin top 402 is made from a stamped material adapted to resemble a stamped tin or tile with different decorative designs, examples of which are shown herein.

In one implementation, the basin top 402 includes a surface 406 and a mouth 408 extending proximally therefrom and defining an opening 410. The bottle body 302 extends through the opening 410 to engage the bottom basin 404. In one implementation, the bottom basin 404 includes engaging features 412 configured to engage the top basin 402. Bird food is dispensed through the distal opening 308 of the bottle 300 into a chamber 420 in the bottom basin 404 where it is held in a bowl 416 formed by a wall 414 extending from a surface 428. In one implementation, the distal engaging features 312 are configured to engage corresponding engaging features 424 defined in an inner wall 418 extending from the surface 428. The inner wall 418 includes one or more apertures 422 to dispense the bird food from the chamber 420 into the bowl 416.

Birds may access the bird food through one or more ports 430 defined in the top surface 402. The ports 430 may have various features to attract birds and or to provide aesthetically pleasing decoration. For example, the ports 430 may include a flower made from metal, plastic, ceramic, wood, and/or the like.

In one implementation, the bottom basin 404 includes a protrusion 426 extending proximally from the surface 428. The distal end 106 of the display insert 100 may rest on the protrusion 426 to hold the hanger display in the interior of the bottle body 302.

Figure 6:
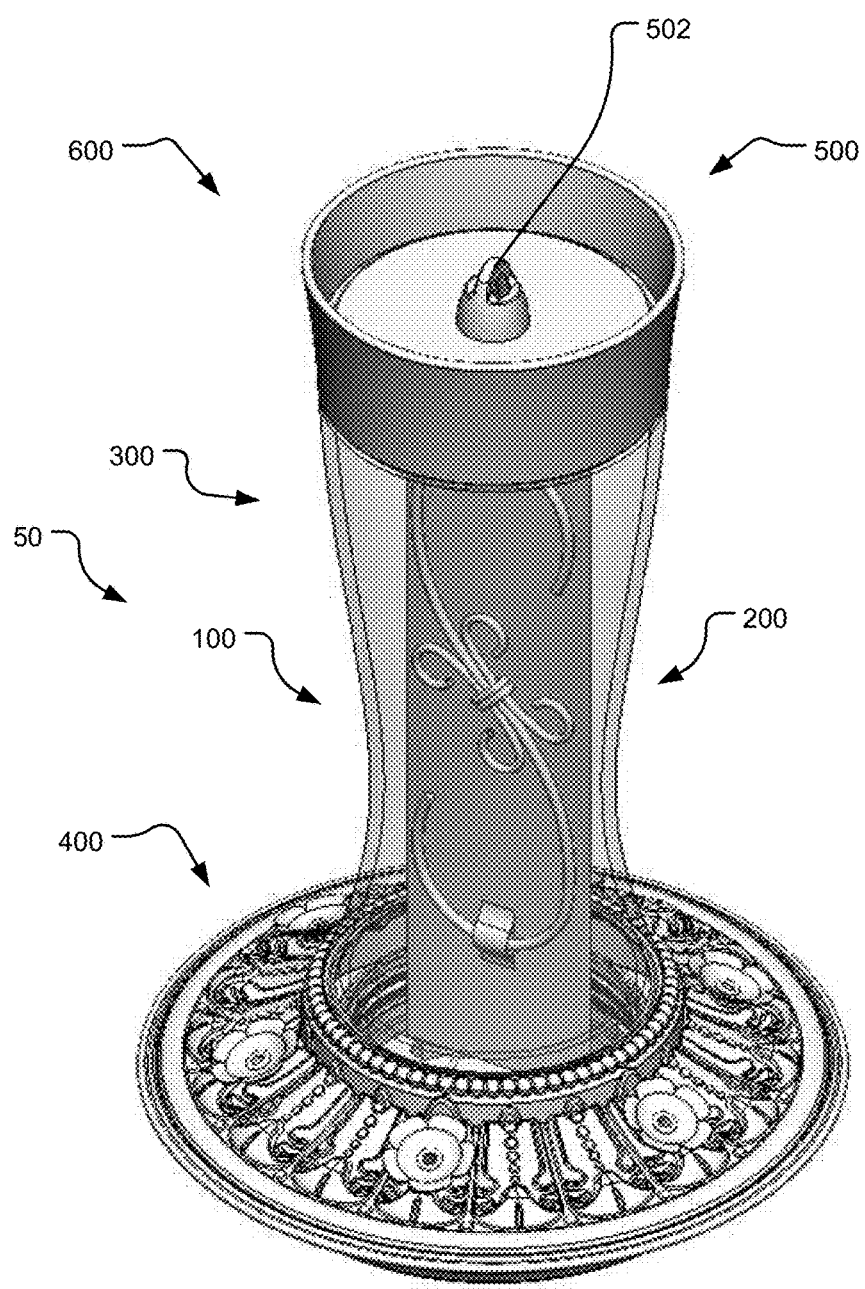
FIG. 6 illustrates an isometric view of an example bird feeder presenting a hanger display.
Figure 7:
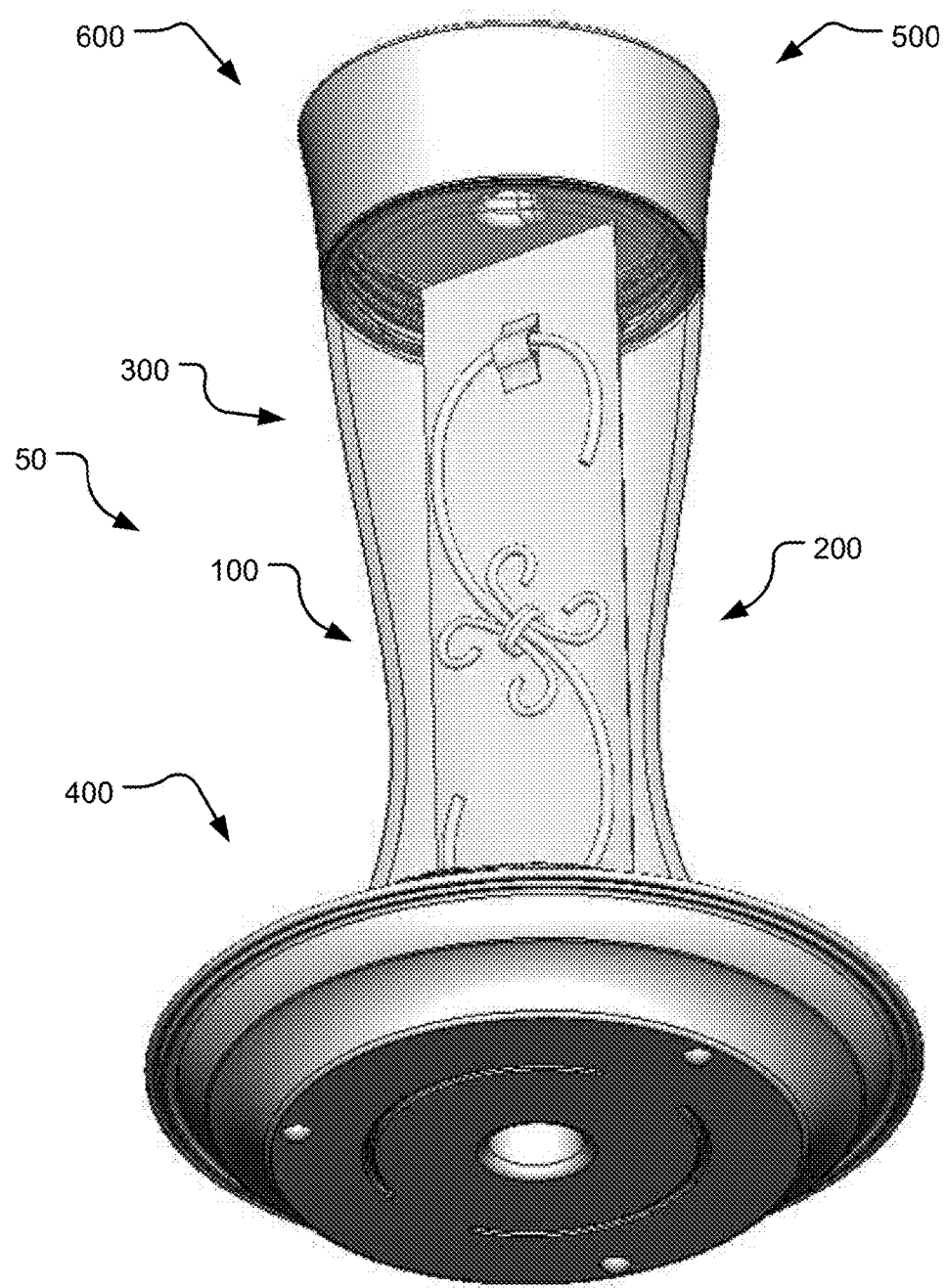
FIG. 7 is a bottom perspective view of the bird feeder of FIG. 6.
Figure 8:
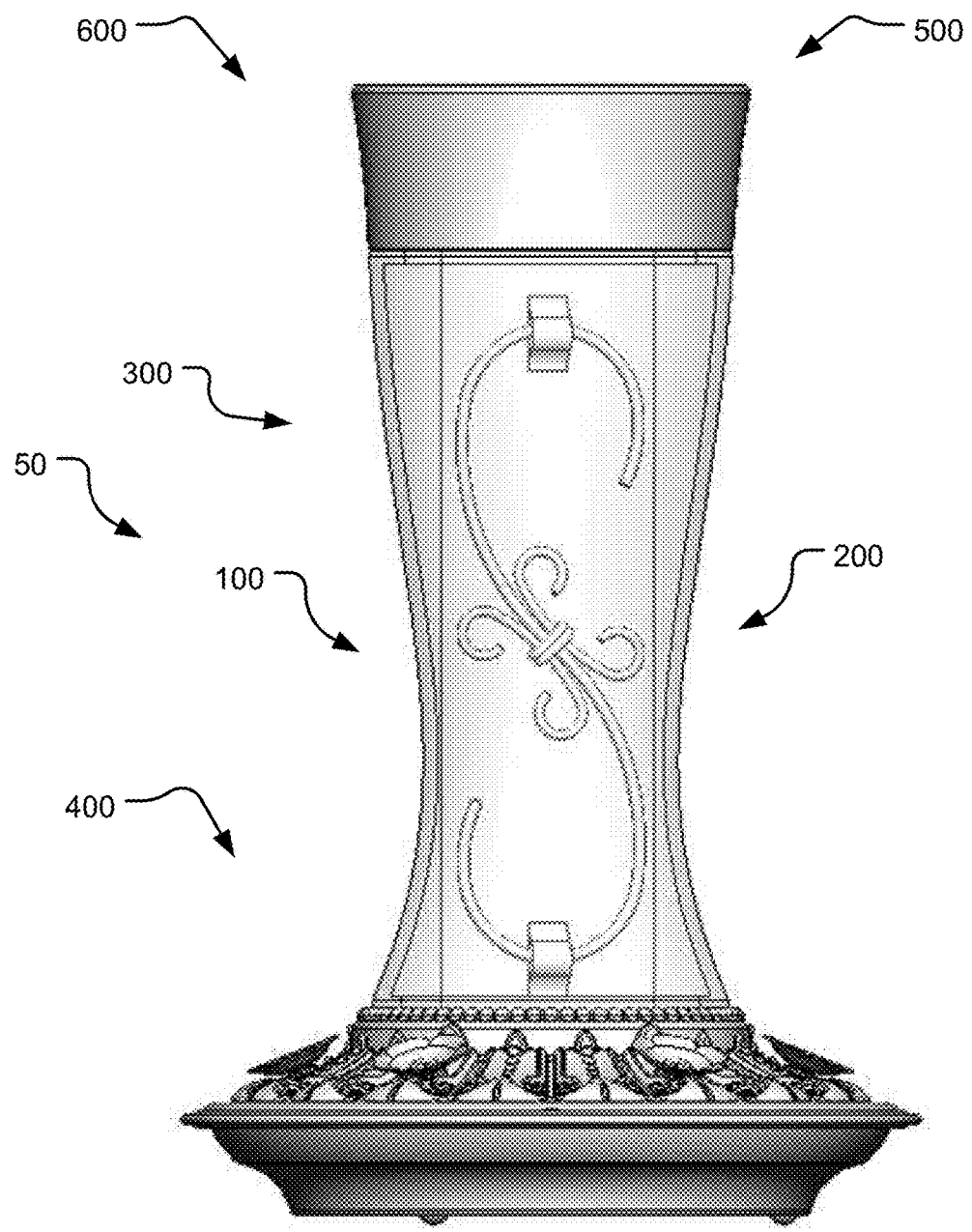
FIG. 8 shows a front view of the bird feeder of FIG. 6.
Figure 9:
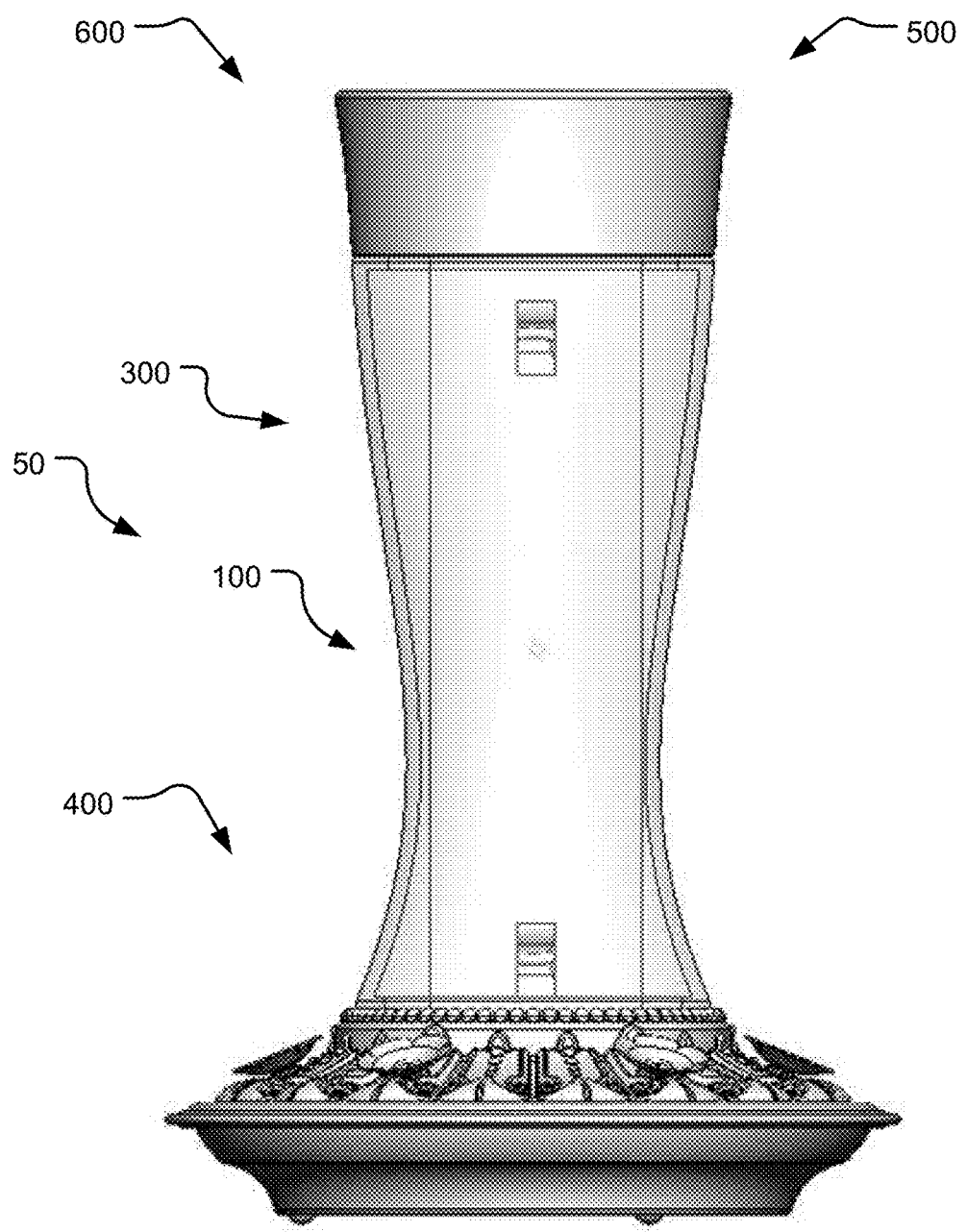
FIG. 9 is a back view of the bird feeder of FIG. 6.
Figure 10:
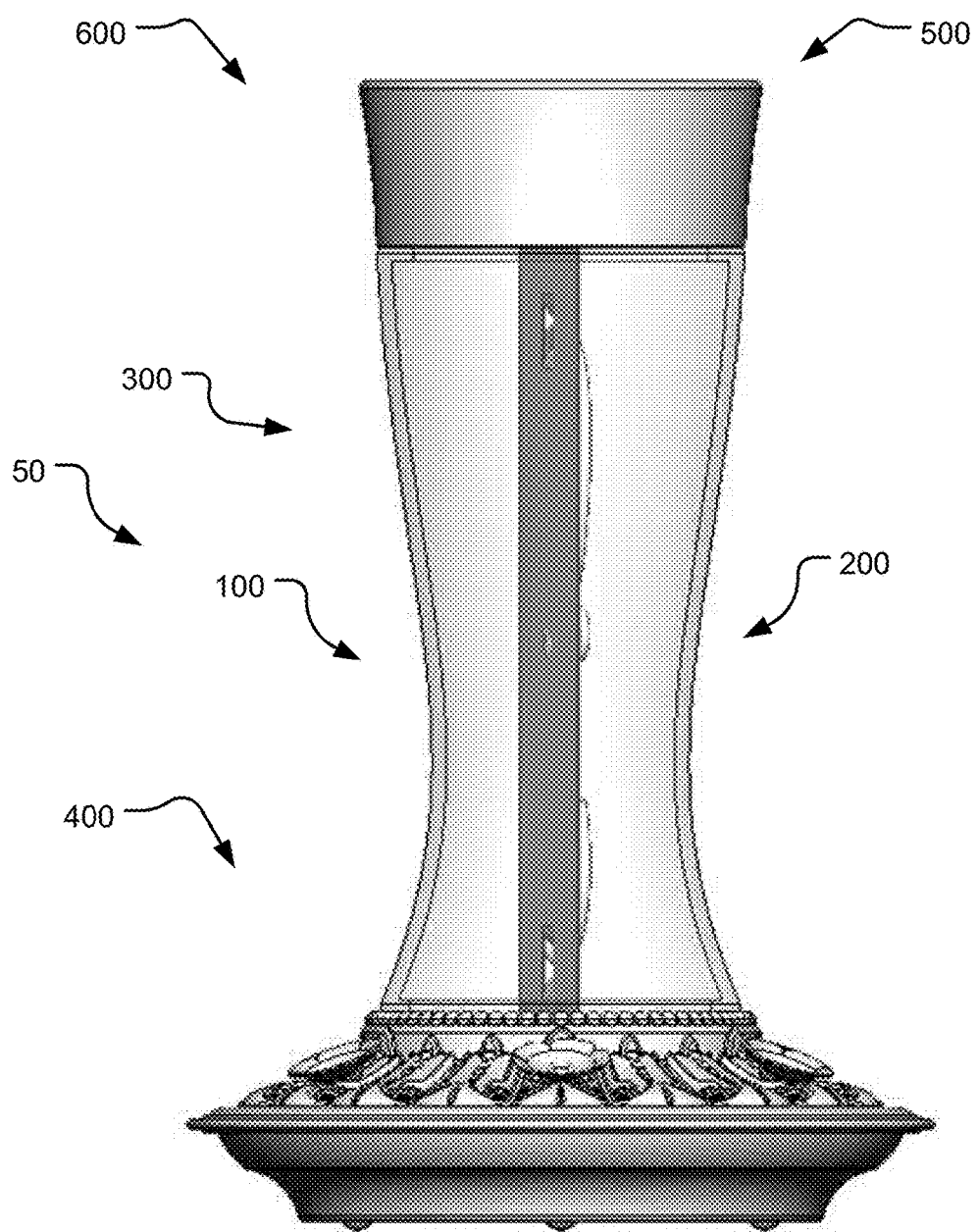
FIG. 10 illustrates a left side view of the bird feeder of FIG. 6.
Figure 11:
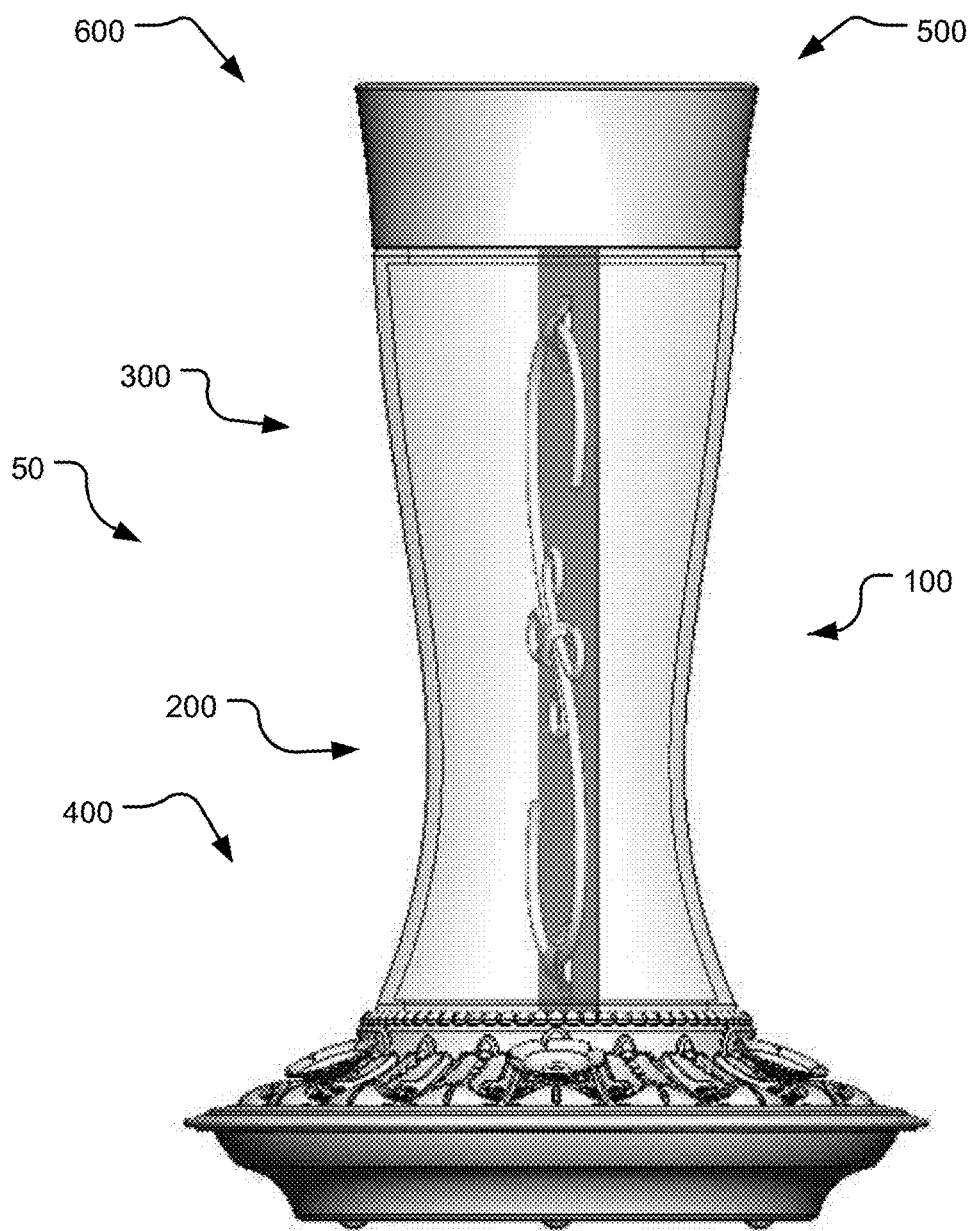
FIG. 11 shows a right side view of the bird feeder of FIG. 6.
Figure 12:
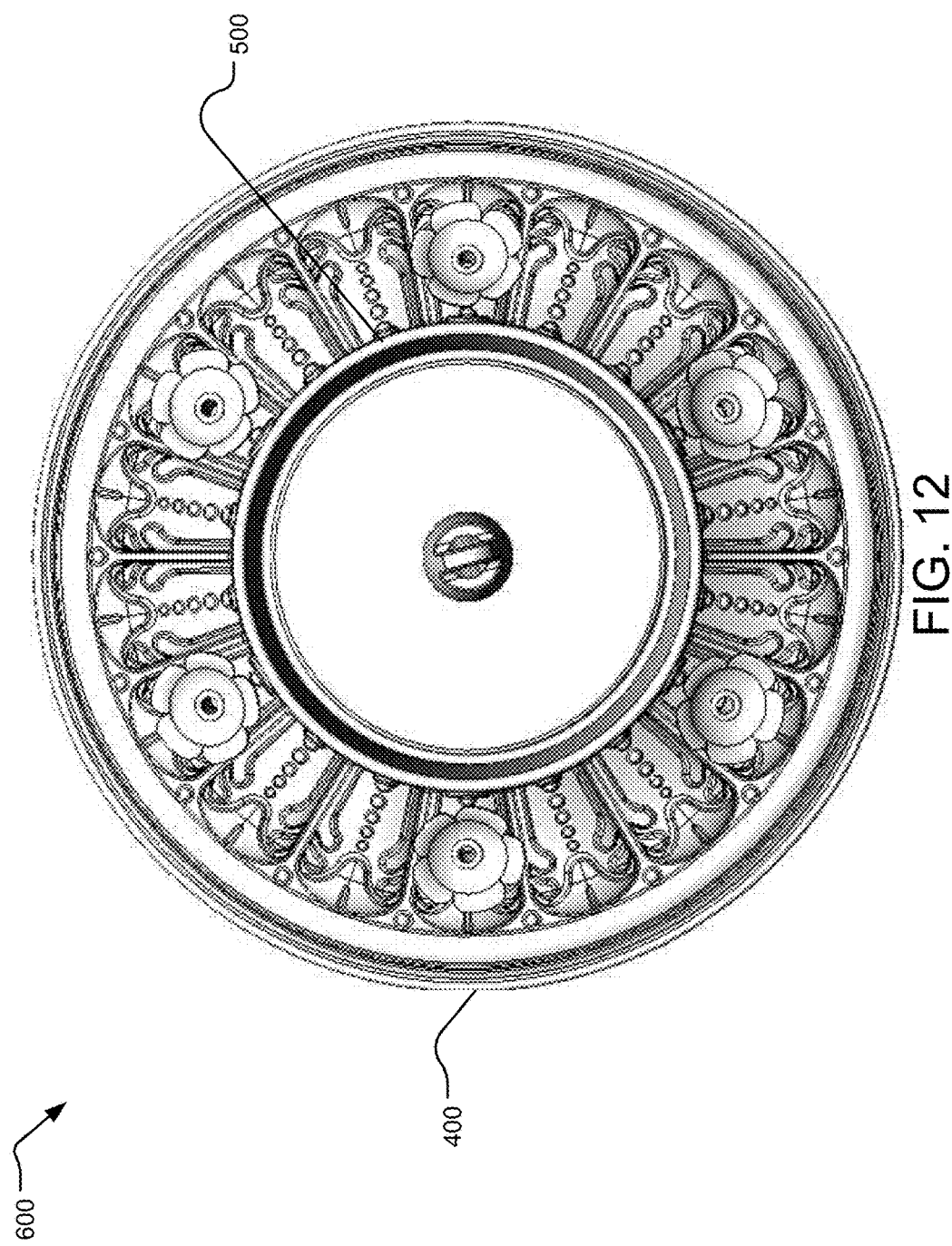
FIG. 12 is a top view of the bird feeder of FIG. 6.
Figure 13:
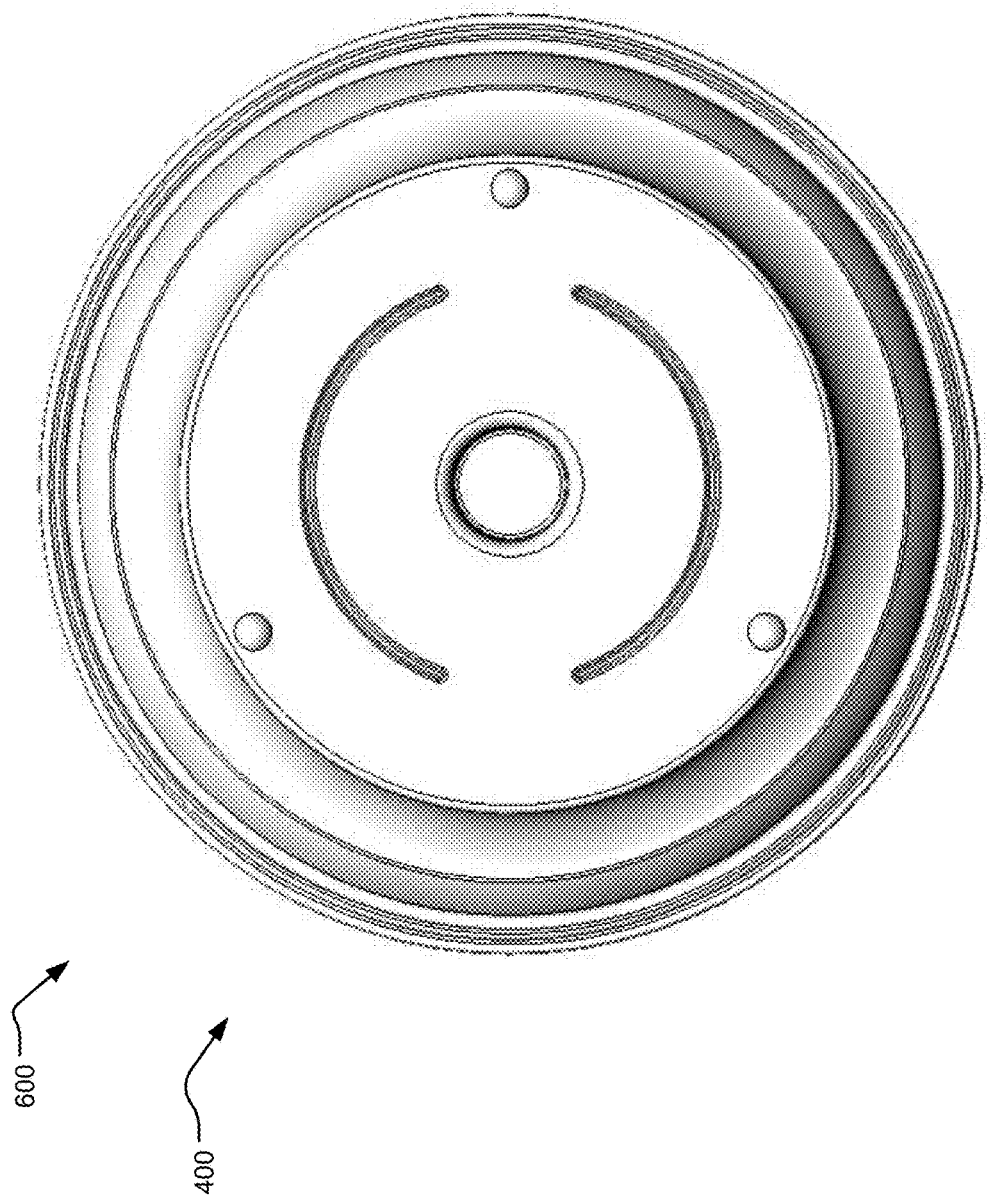
FIG. 13 is a bottom view of the bird feeder of FIG. 6.
Figure 14:
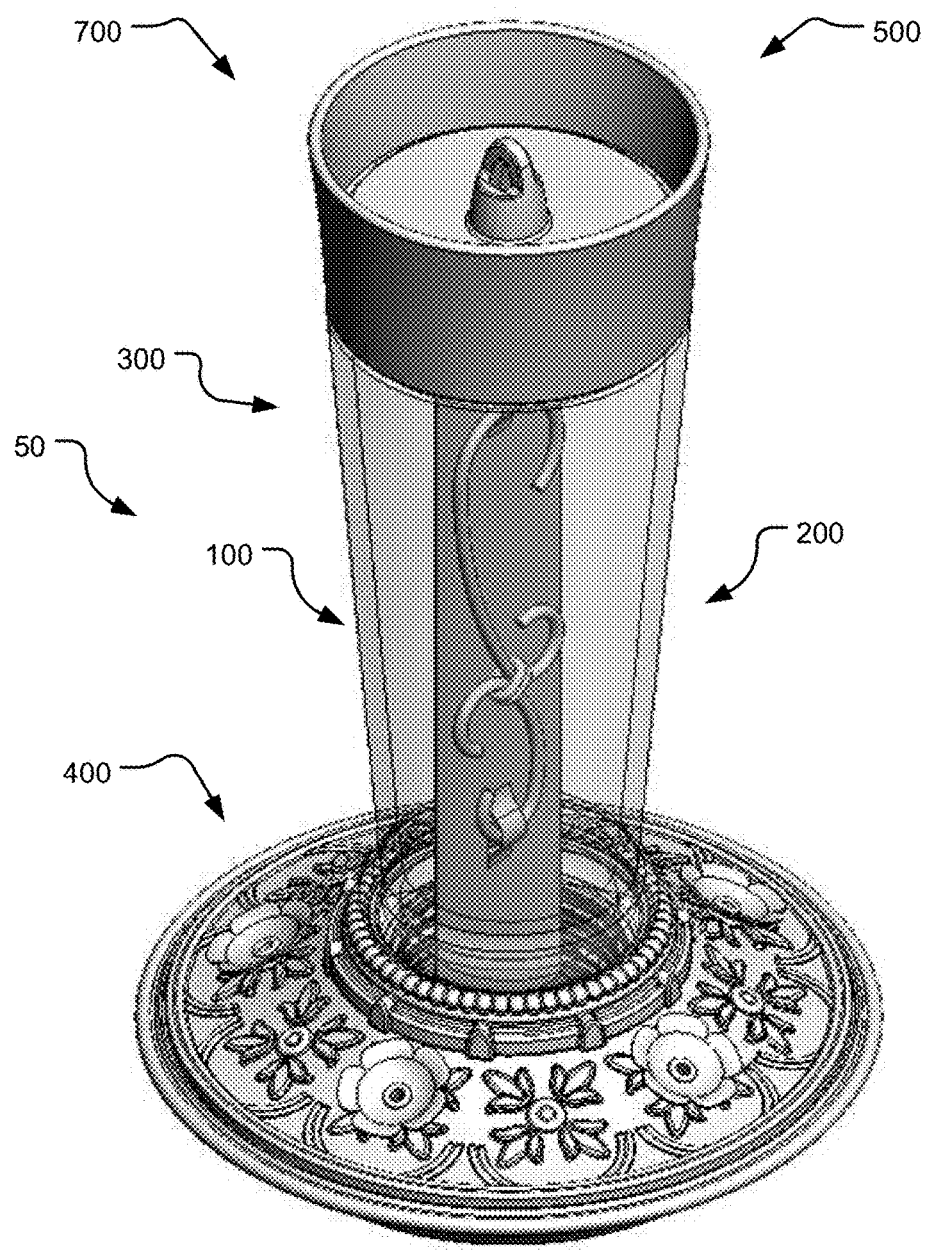
FIG. 14 illustrates an isometric view of another example bird feeder presenting a hanger display.
Figure 15:
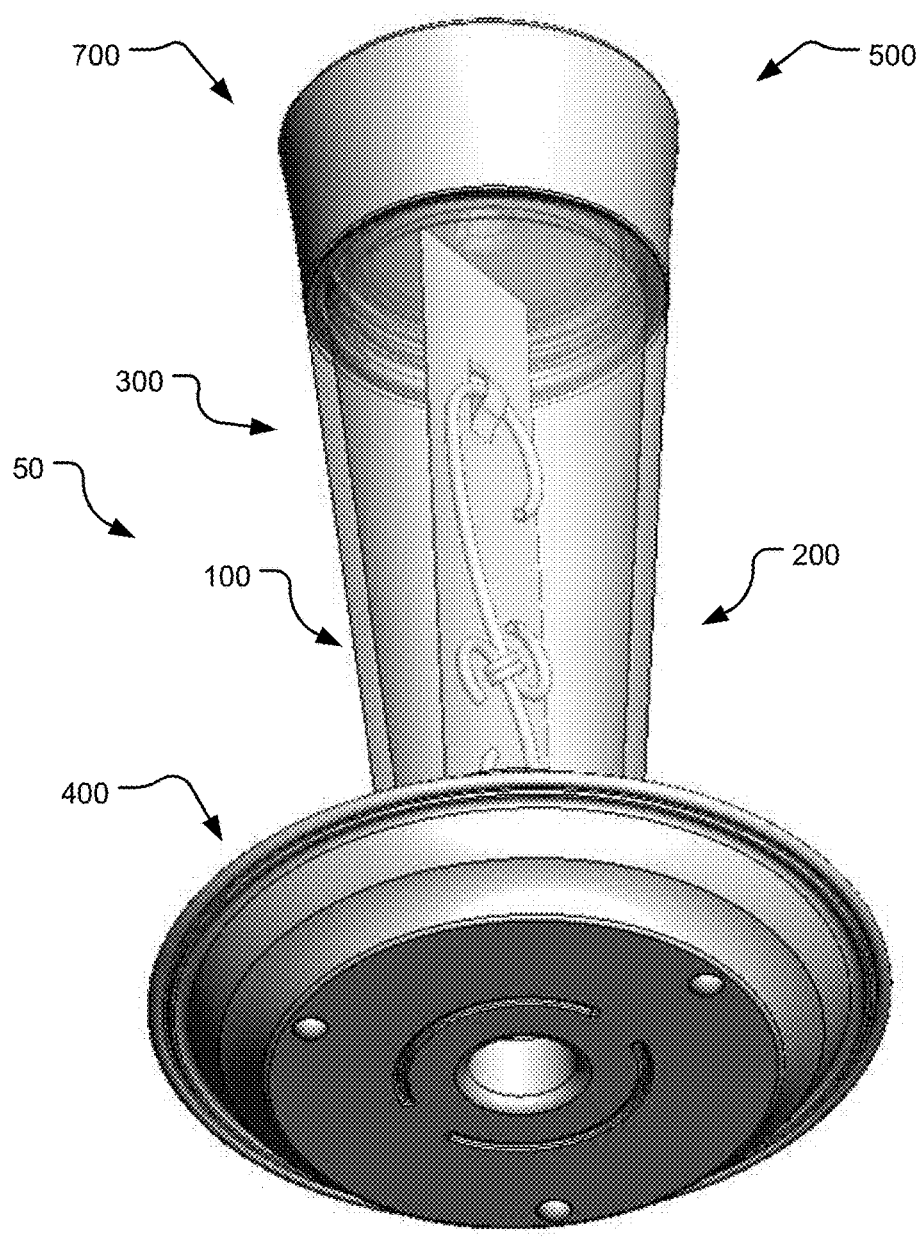
FIG. 15 is a bottom perspective view of the bird feeder of FIG. 14.
Figure 16:
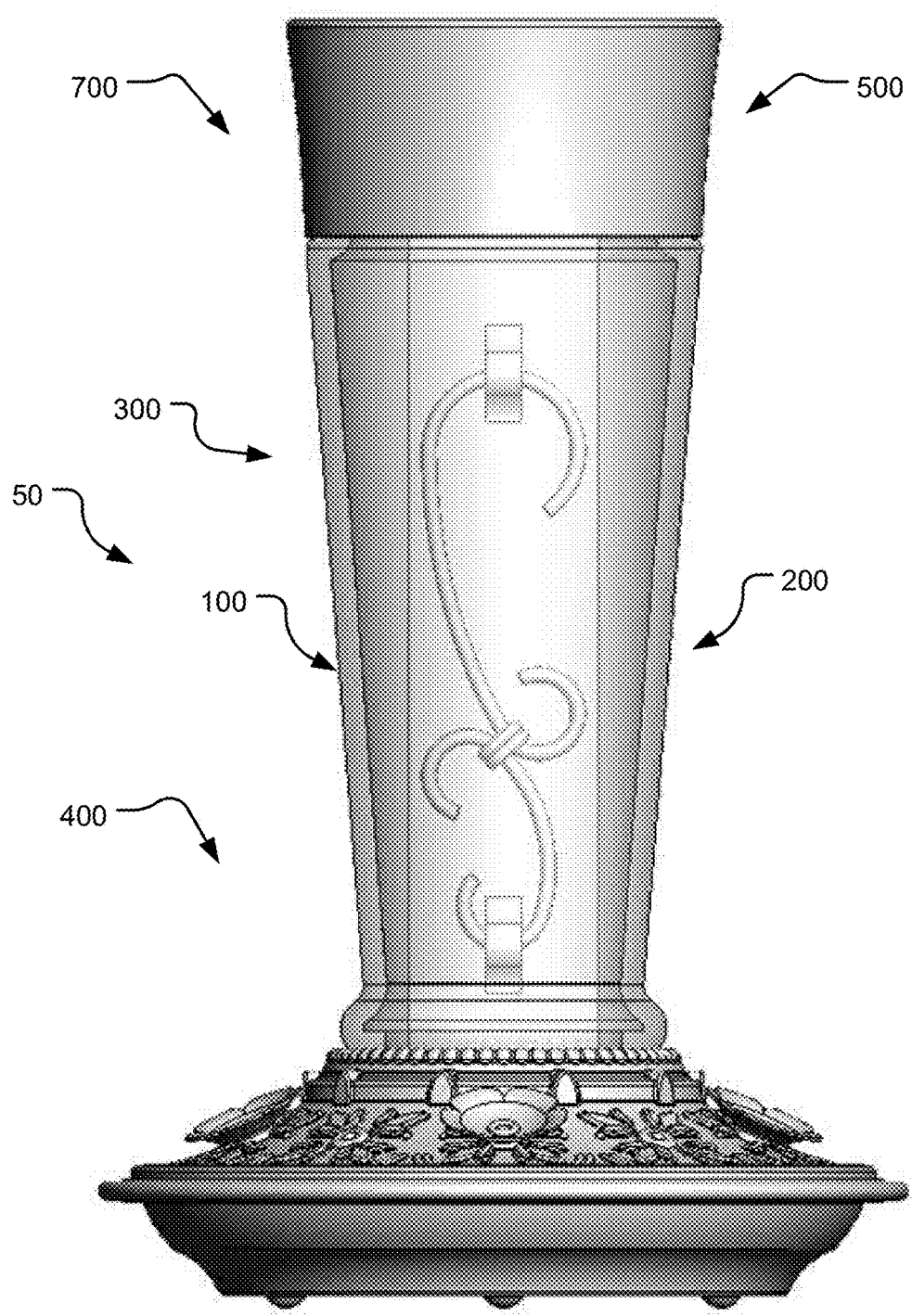
FIG. 16 shows a front view of the bird feeder of FIG. 14.
Figure 17:
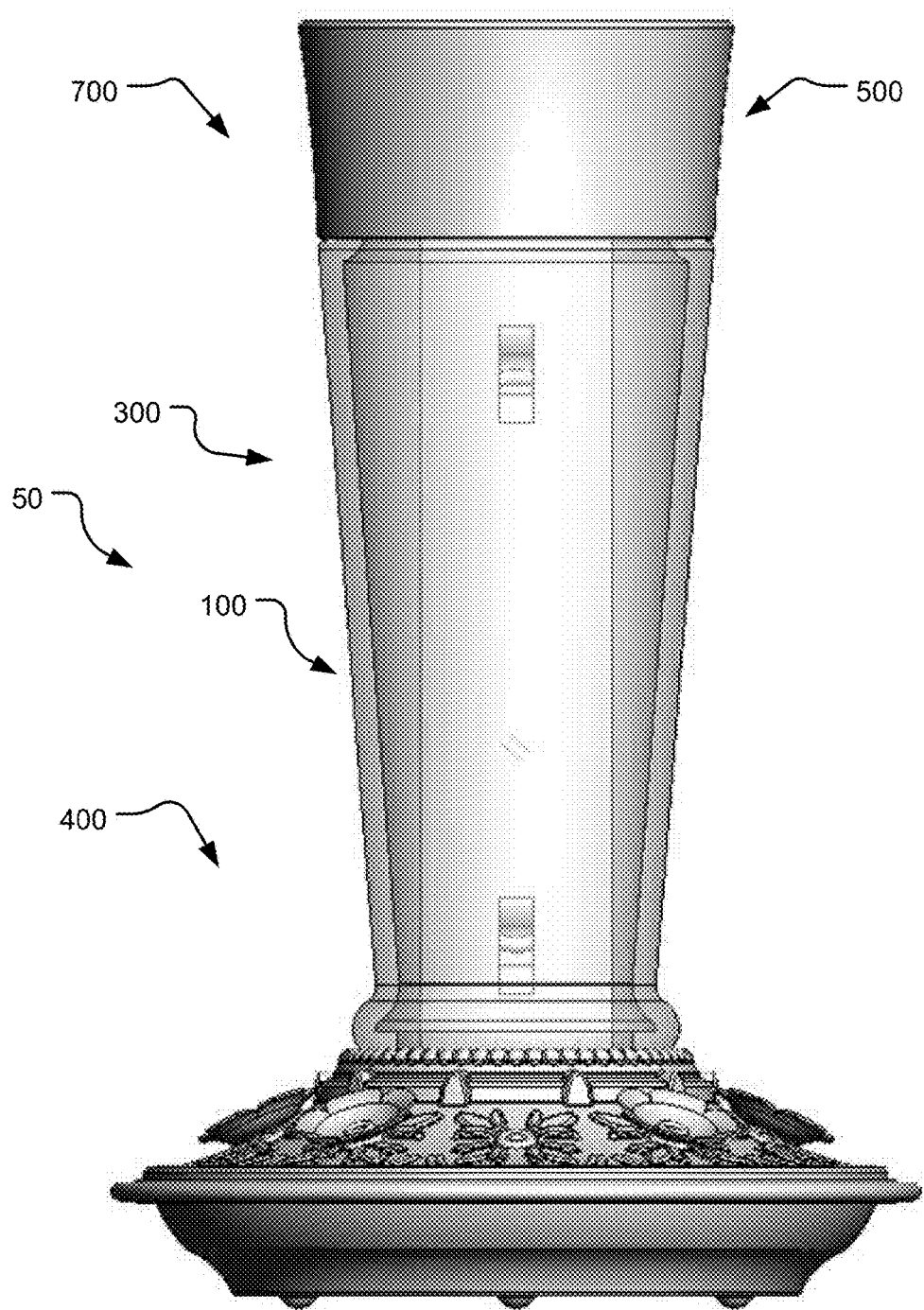
FIG. 17 is a back view of the bird feeder of FIG. 14.
Figure 18:
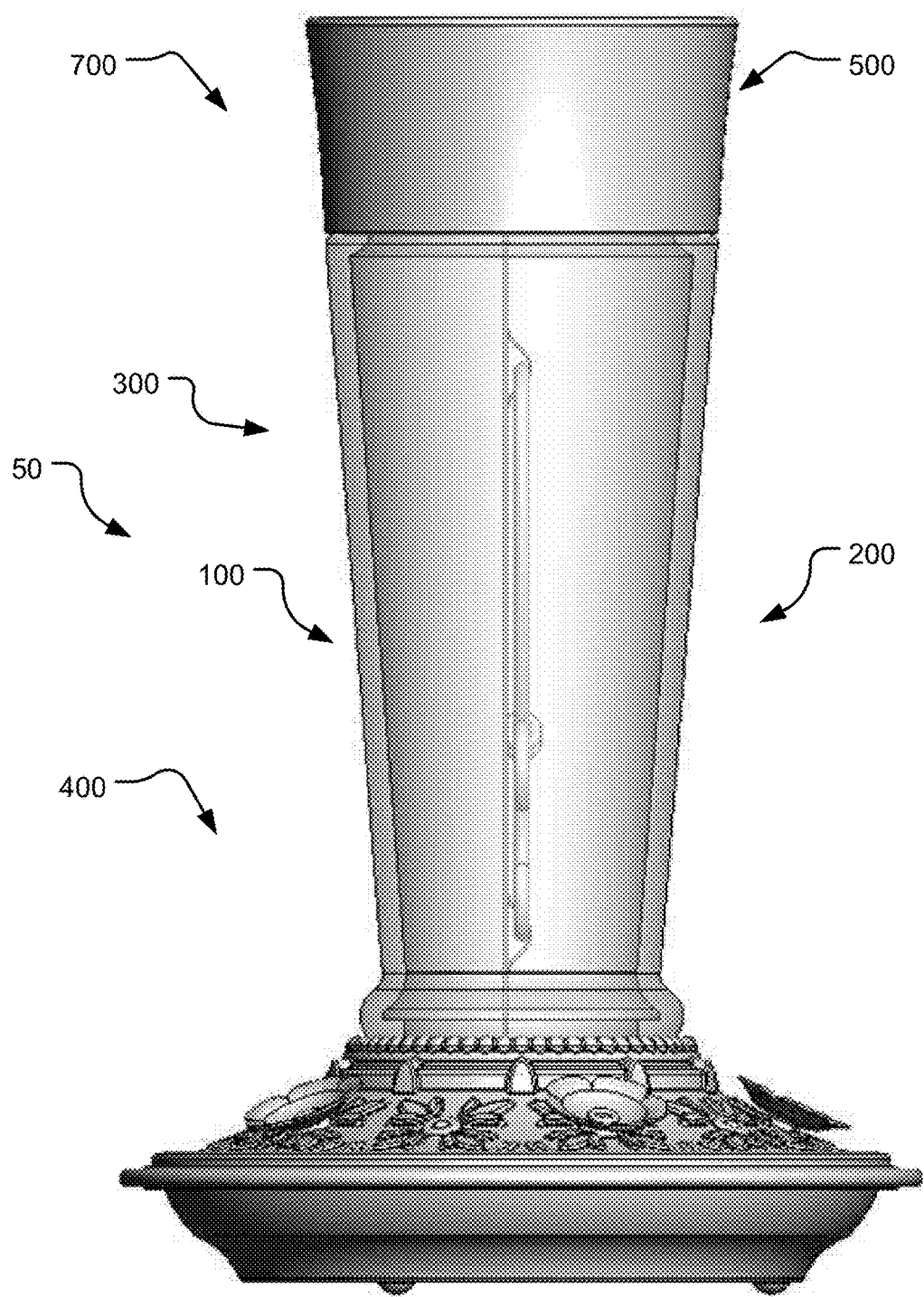
FIG. 18 illustrates a left side view of the bird feeder of FIG. 14.
Figure 19:
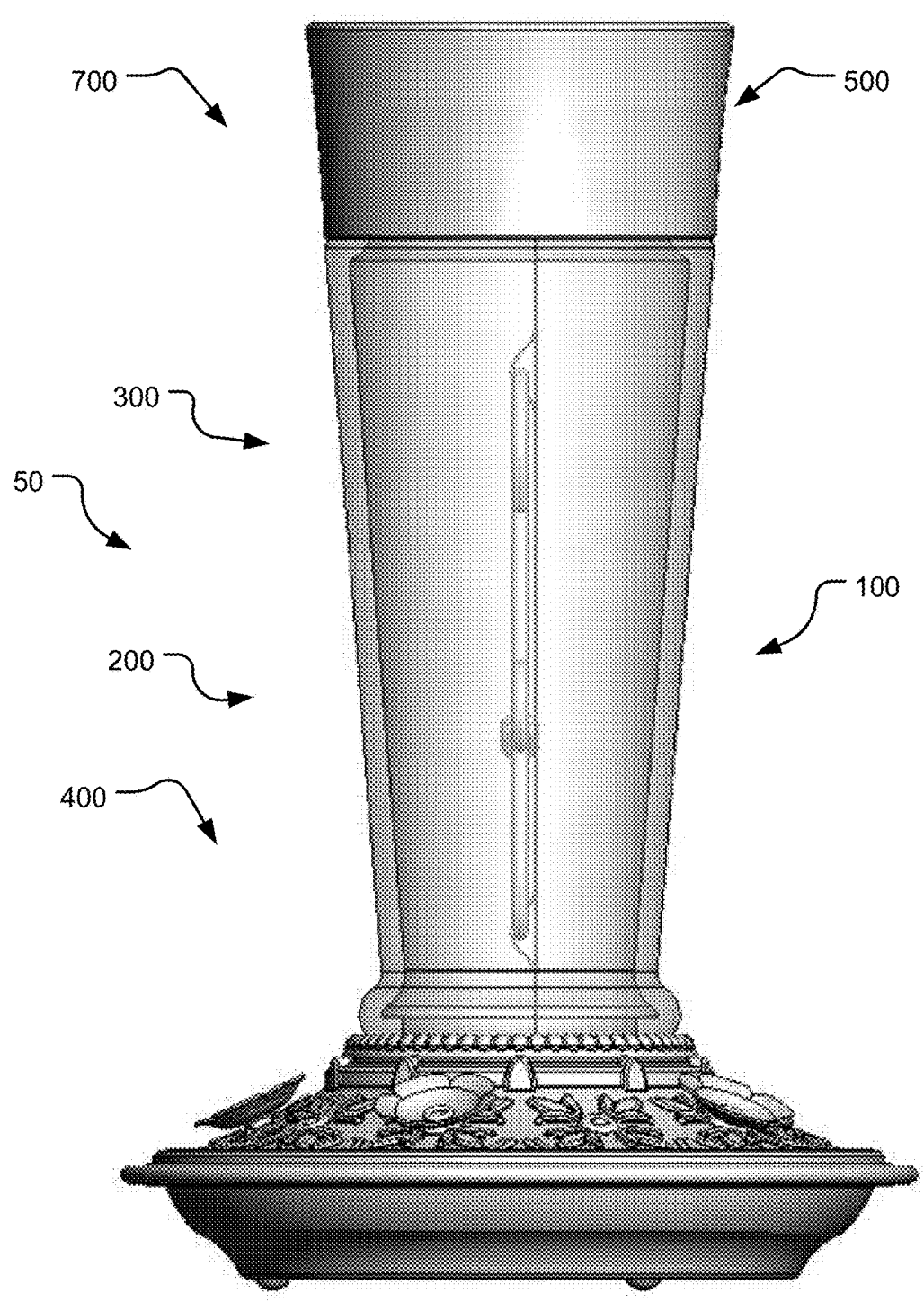
FIG. 19 shows a right side view of the bird feeder of FIG. 14.
Figure 20:
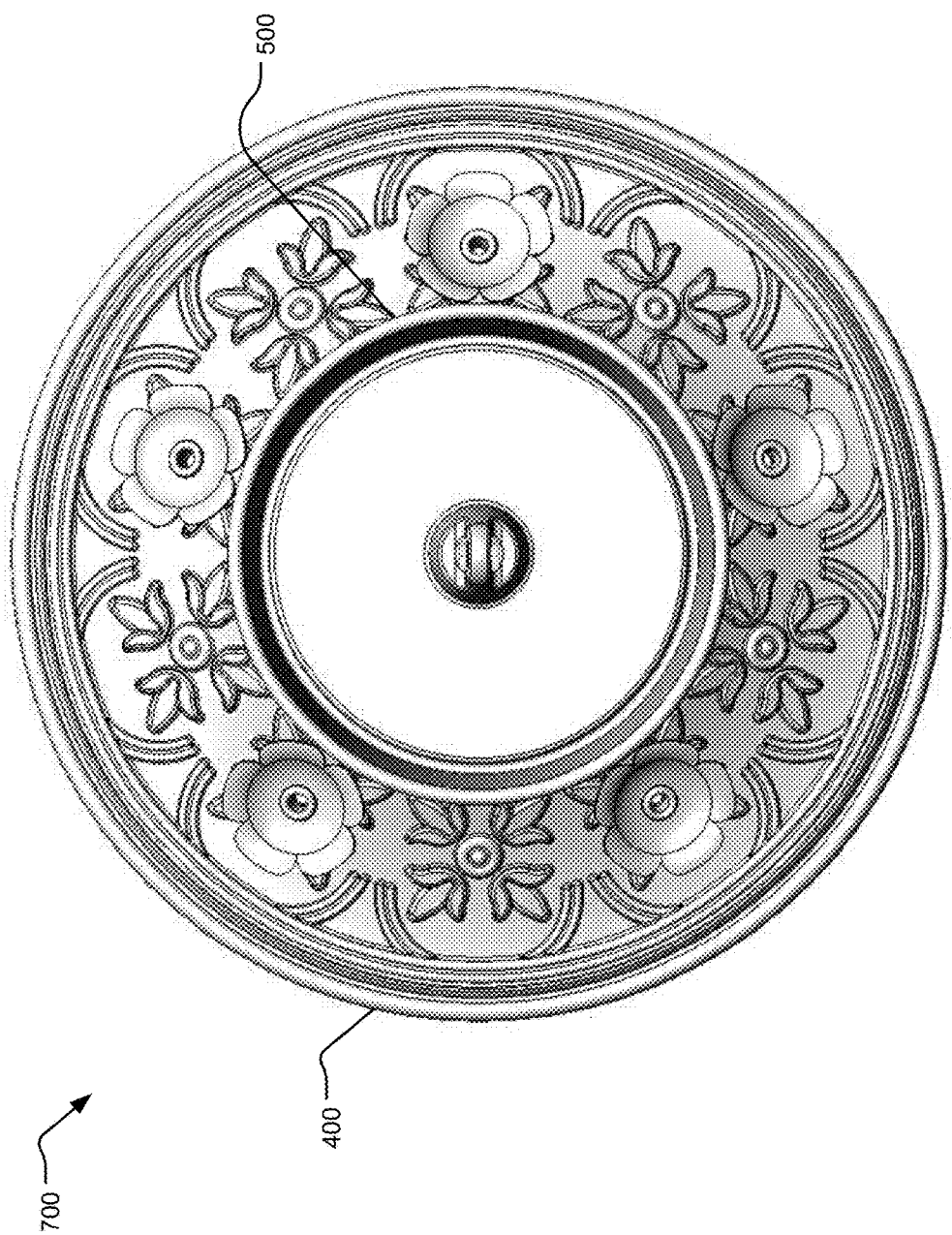
FIG. 20 is a top view of the bird feeder of FIG. 14.
Figure 21:
FIG. 21 is a bottom view of the bird feeder of FIG. 14.
Figure 22:
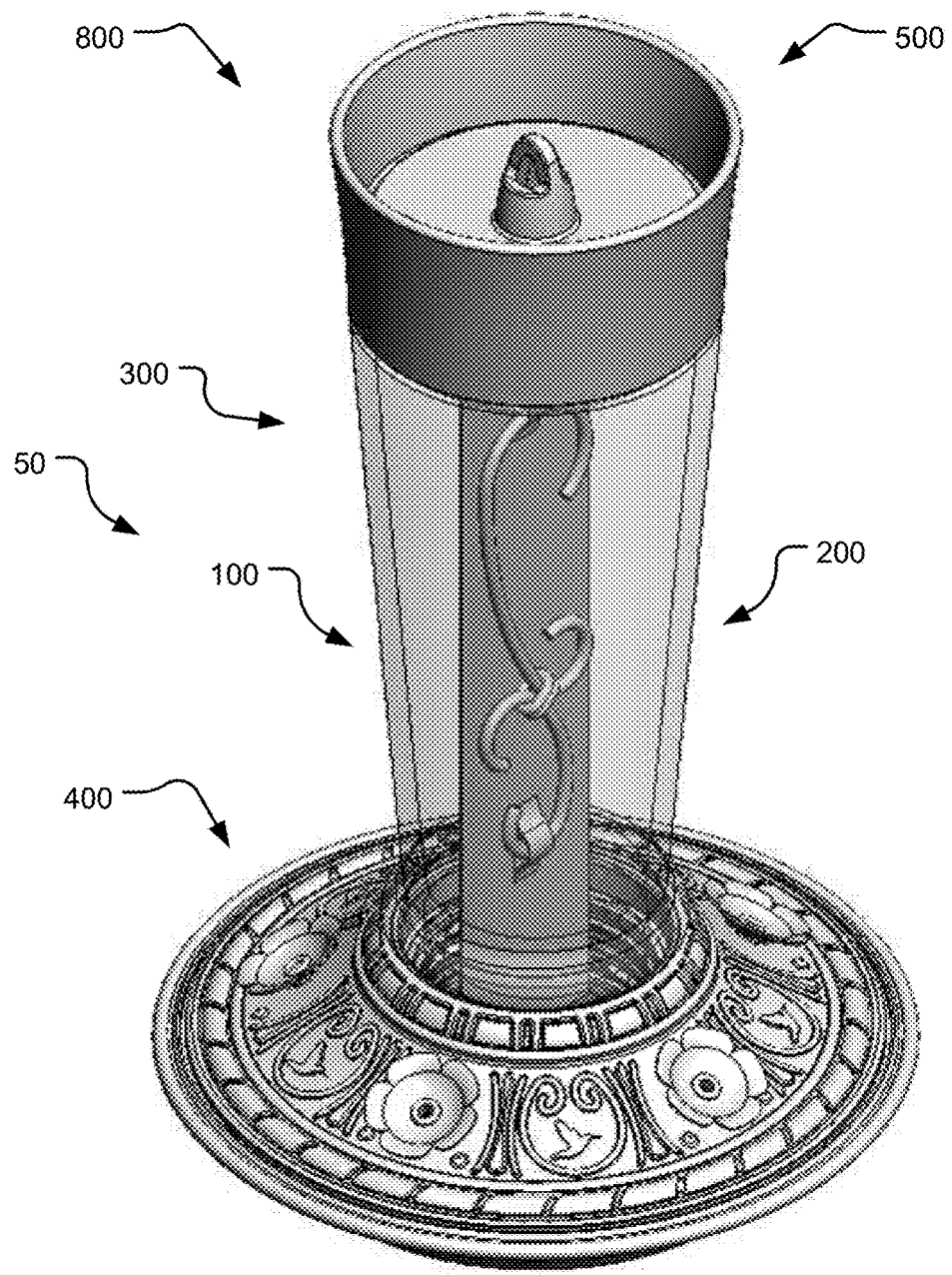
FIG. 22 illustrates an isometric view of another example bird feeder presenting a hanger display.
Figure 23:
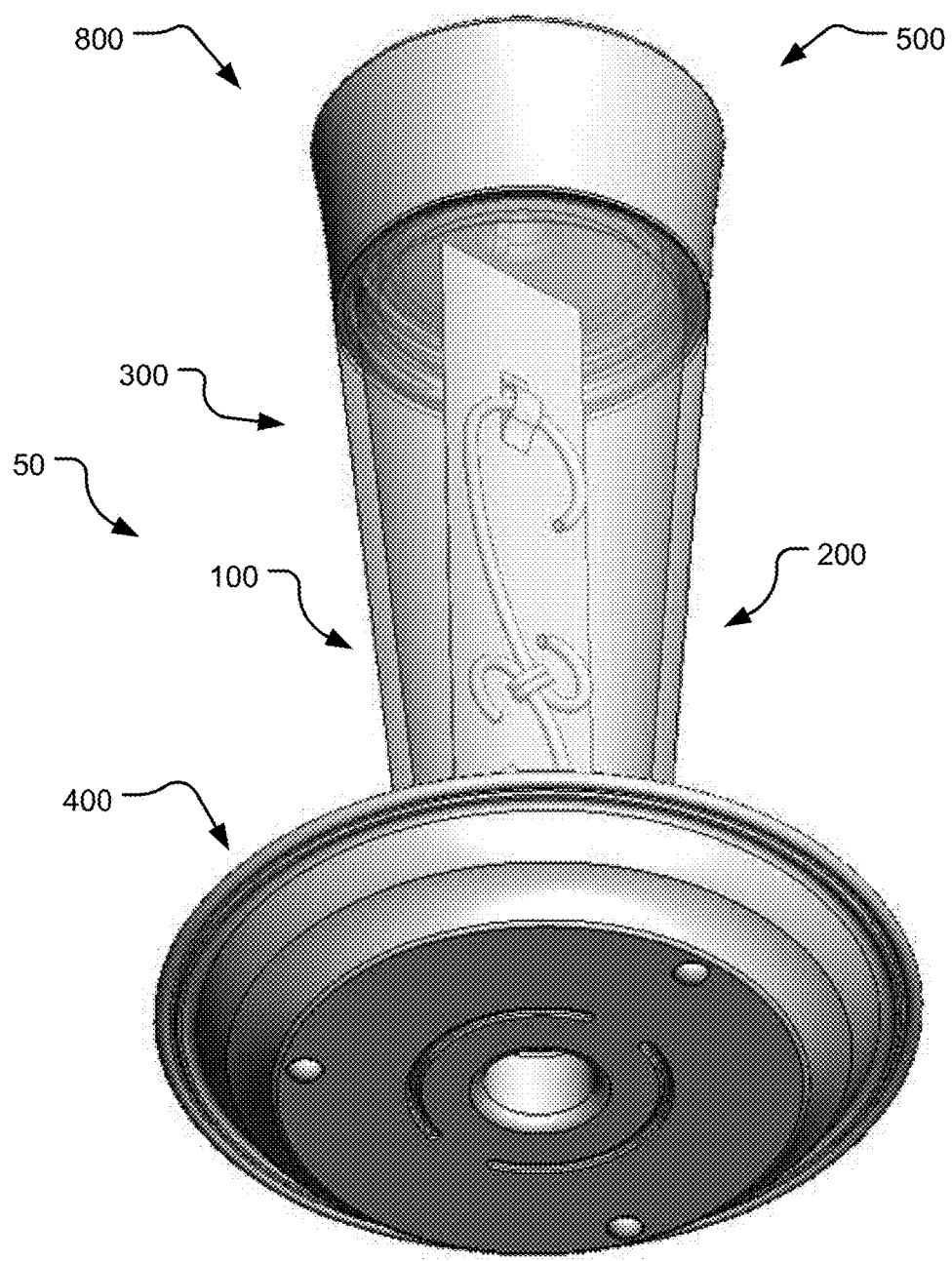
FIG. 23 is a bottom perspective view of the bird feeder of FIG. 22.
Figure 24:
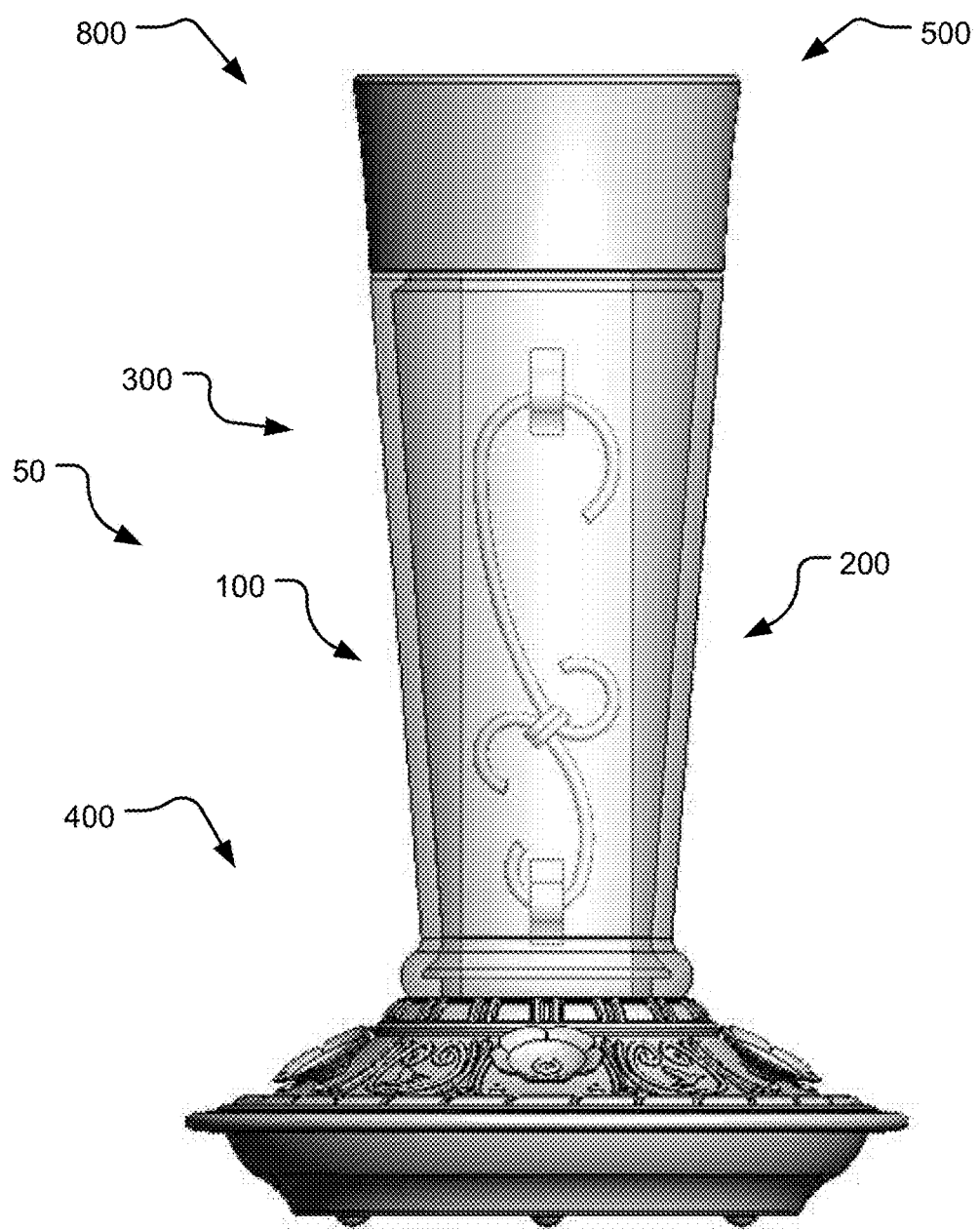
FIG. 24 shows a front view of the bird feeder of FIG. 22.
Figure 25:
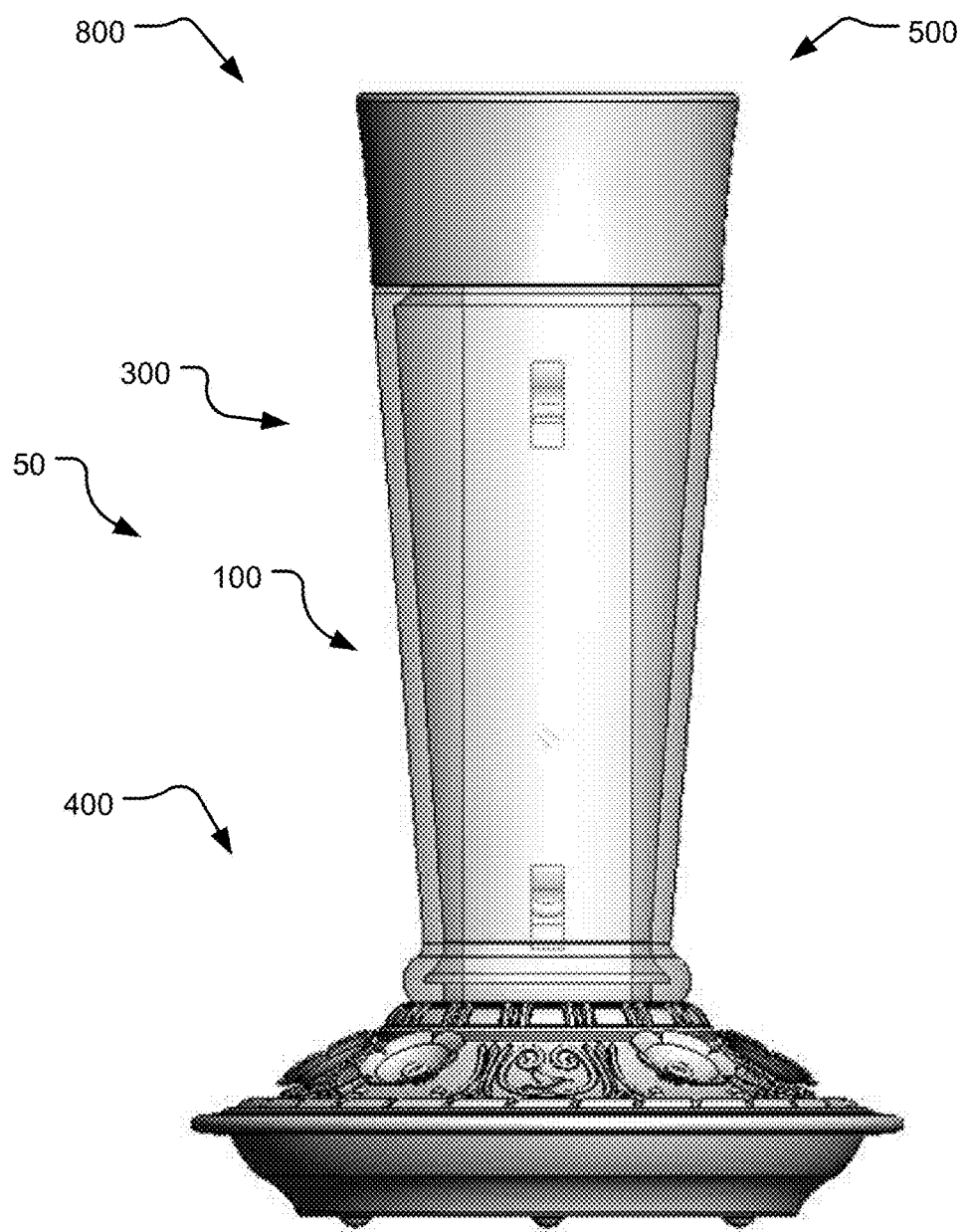
FIG. 25 is a back view of the bird feeder of FIG. 22.
Figure 26:
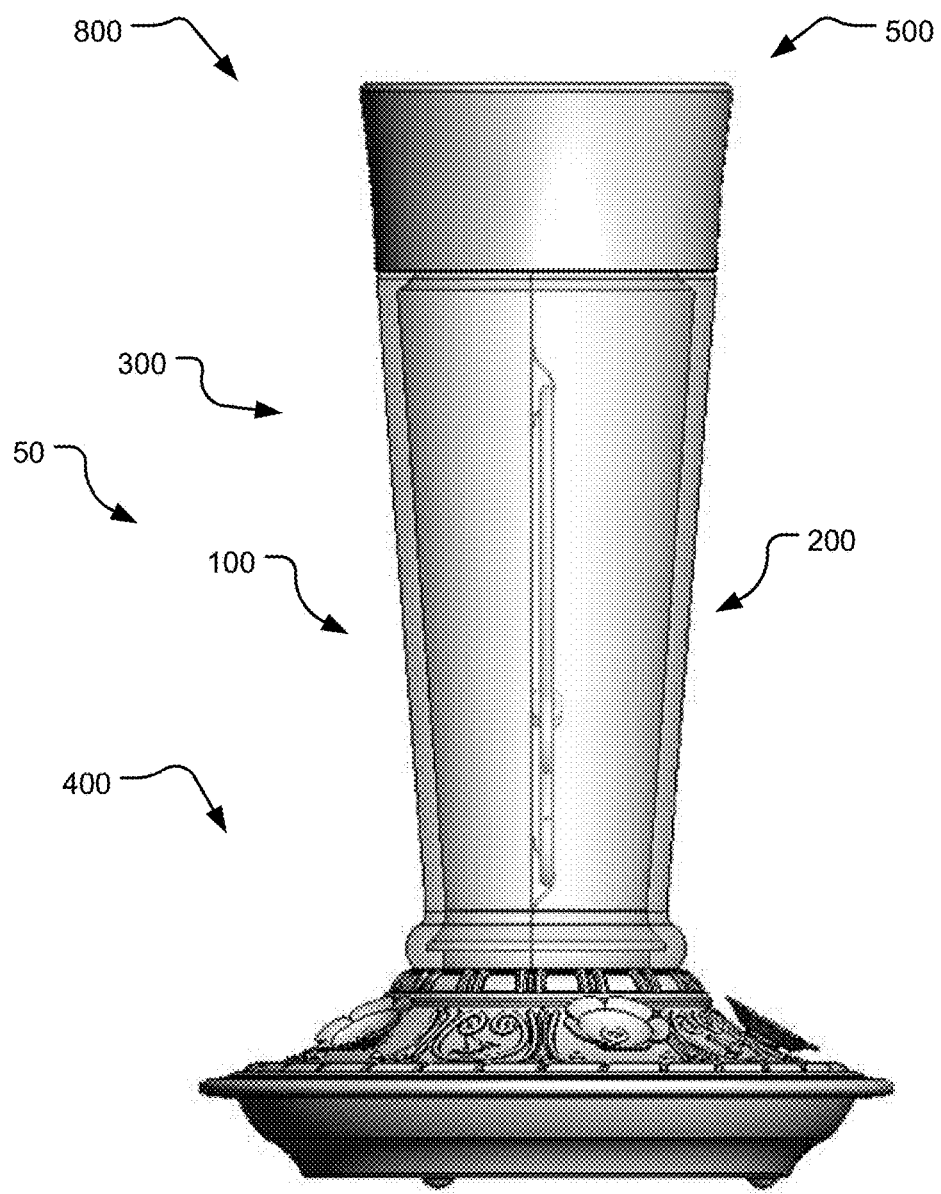
FIG. 26 illustrates a left side view of the bird feeder of FIG. 22.
Figure 27:
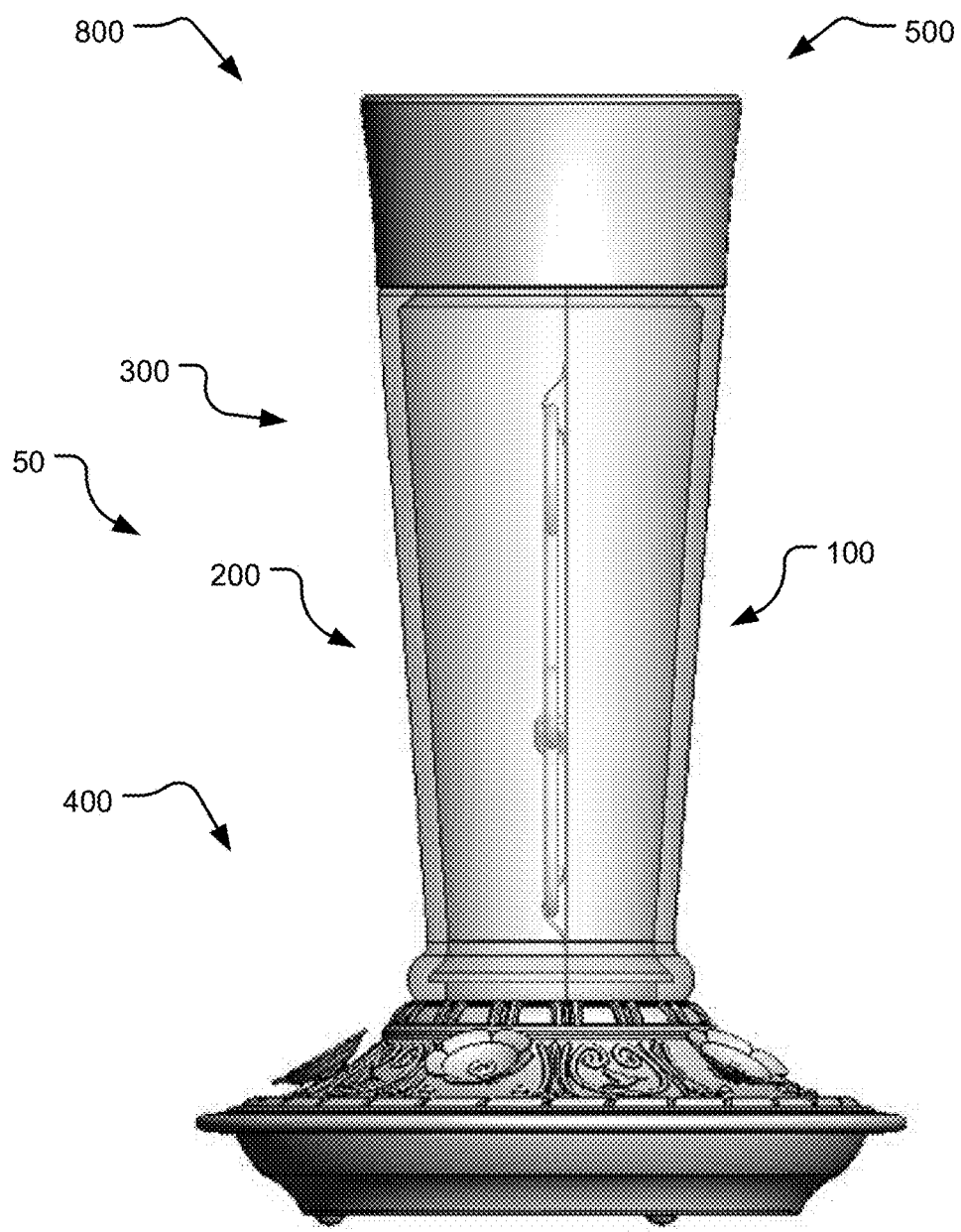
FIG. 27 shows a right side view of the bird feeder of FIG. 22.
Figure 28:
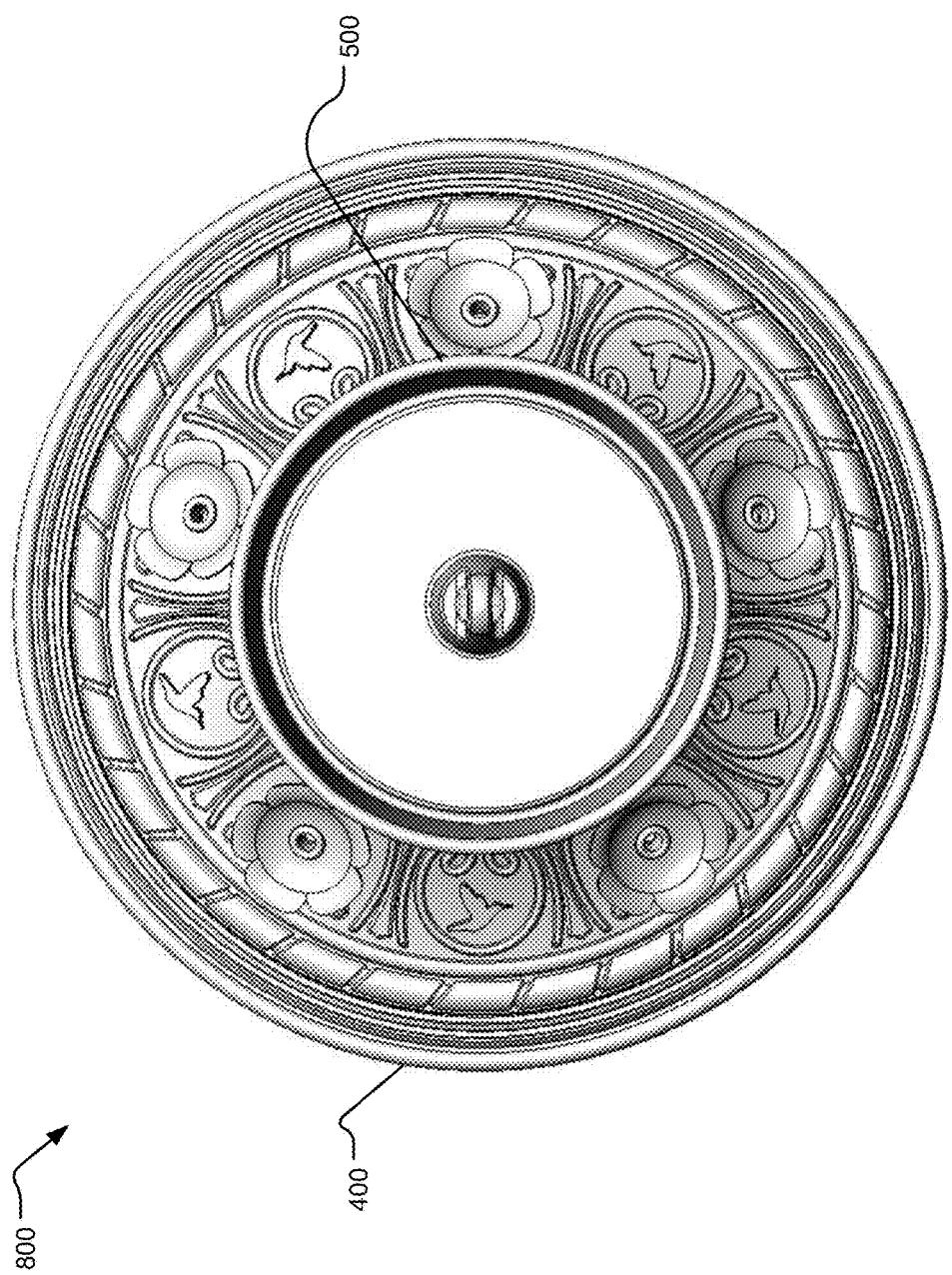
FIG. 28 is a top view of the bird feeder of FIG. 22.
Figure 29:
FIG. 29 is a bottom view of the bird feeder of FIG. 22.
Figure 30:
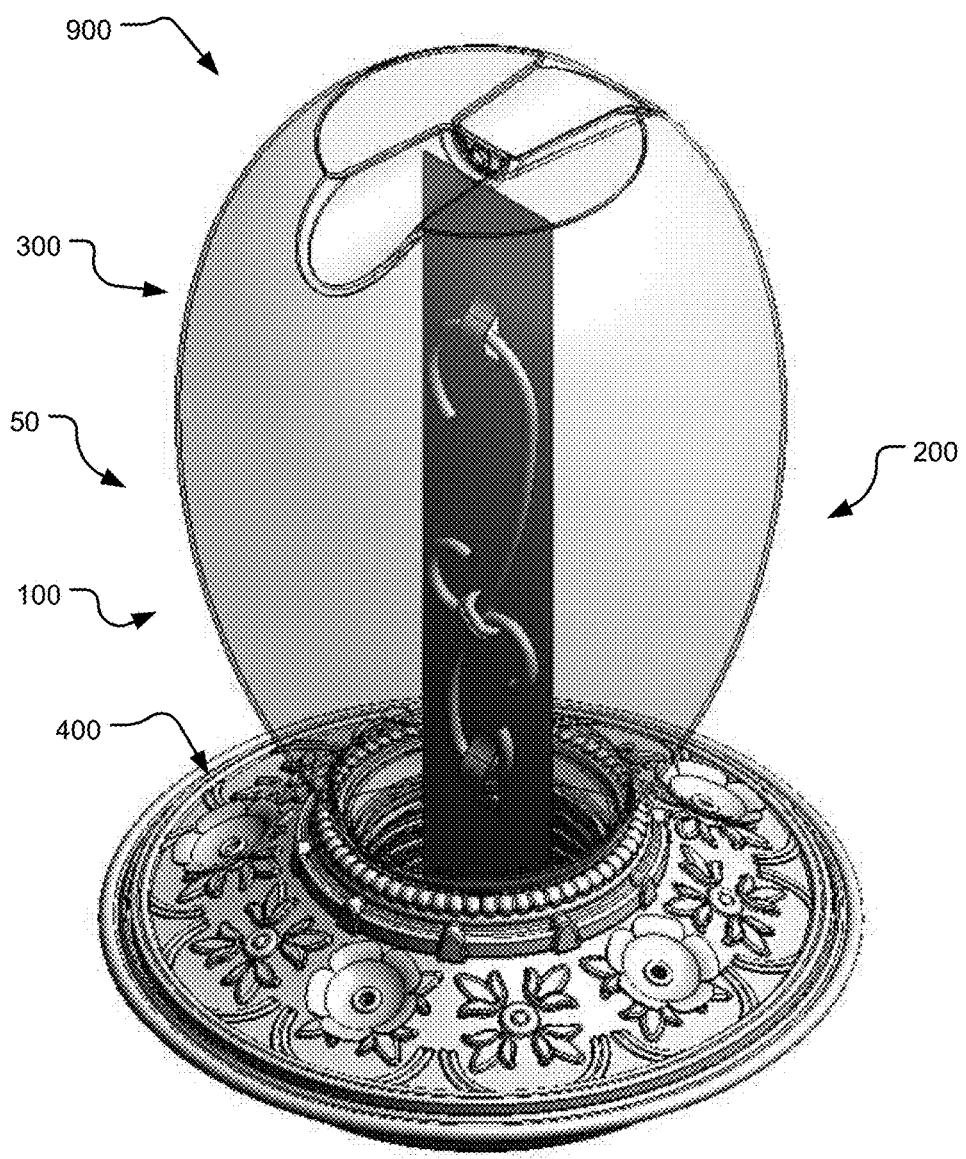
FIG. 30 illustrates an isometric view of another example bird feeder presenting a hanger display.
Figure 31:
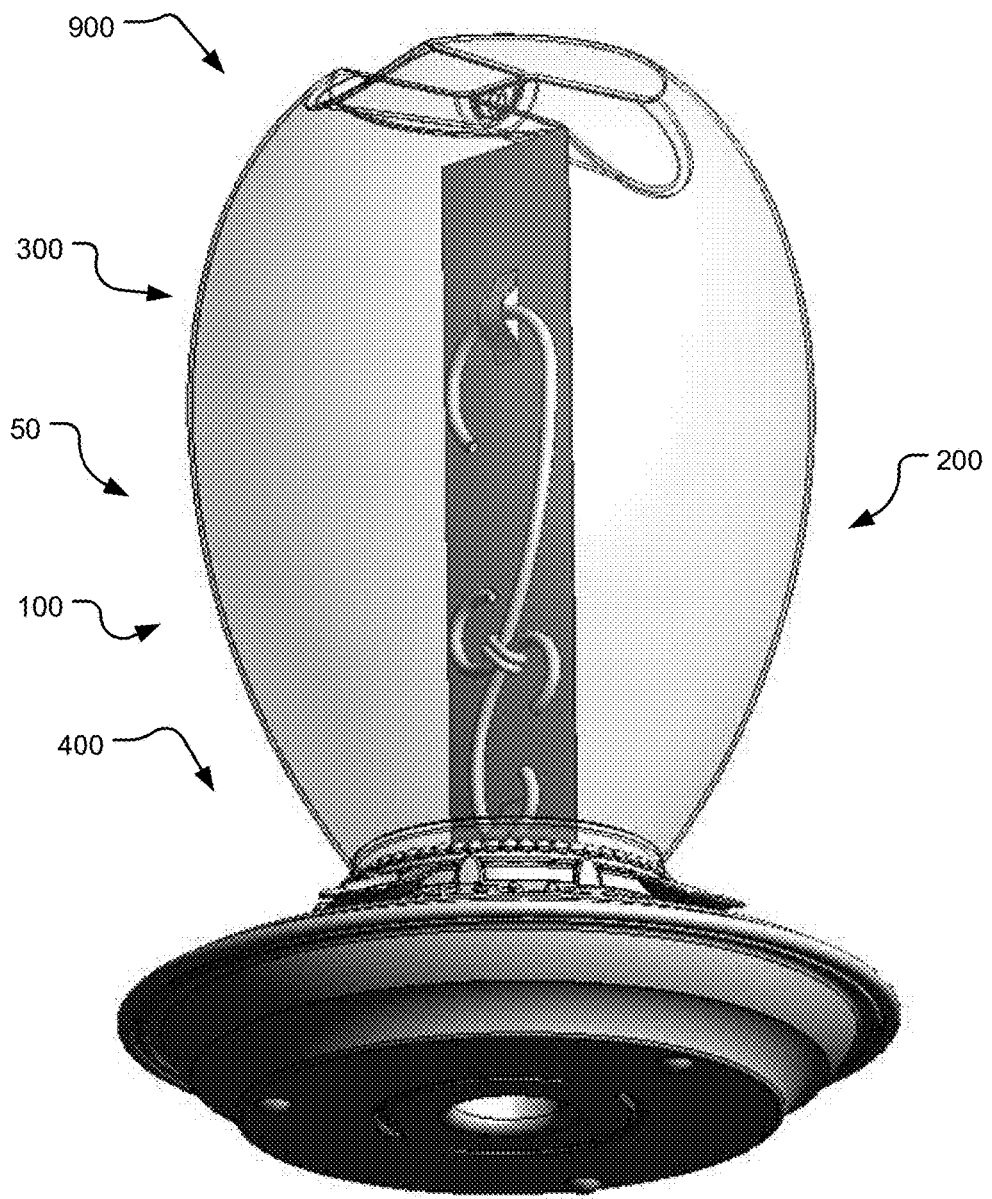
FIG. 31 is a bottom perspective view of the bird feeder of FIG. 30.
Figure 32:
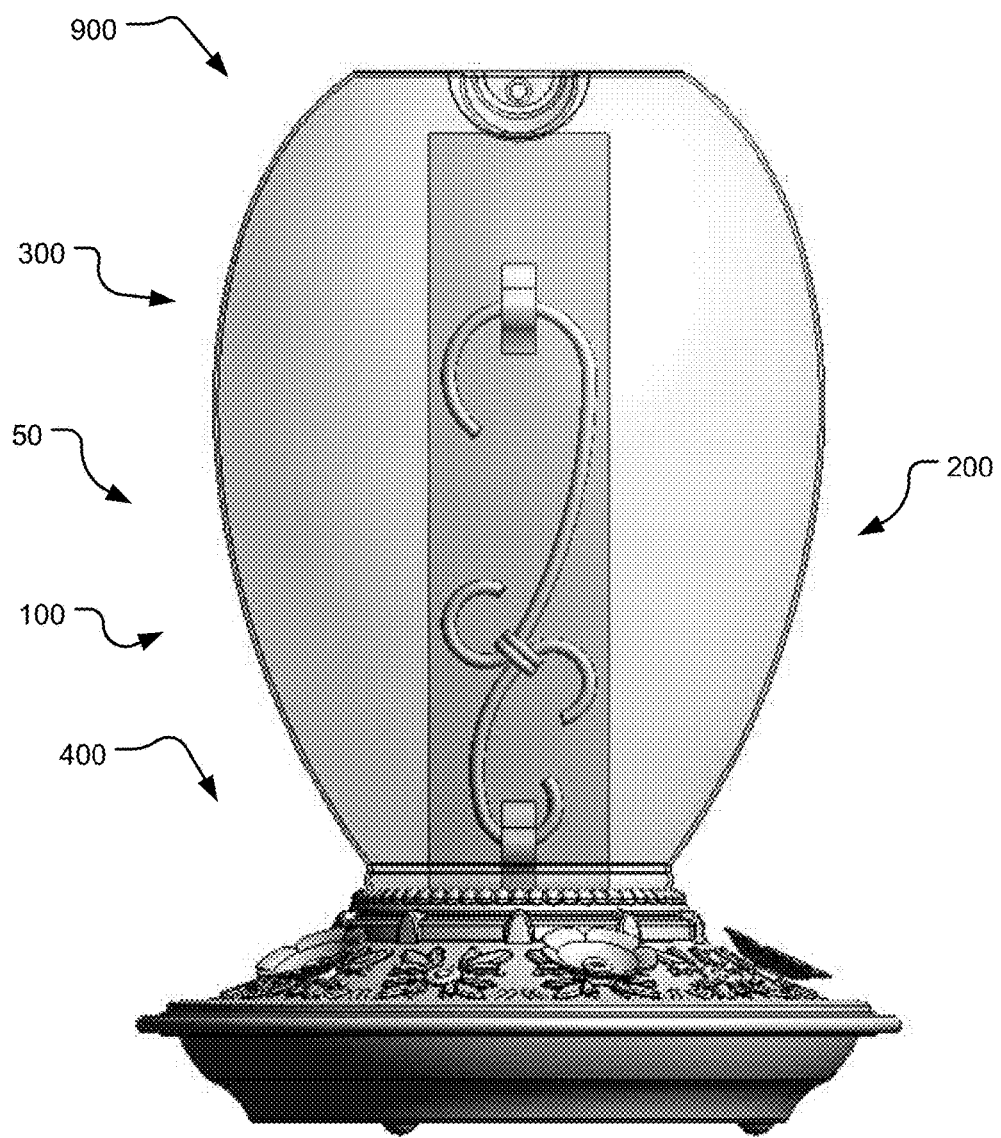
FIG. 32 shows a front view of the bird feeder of FIG. 30.
Figure 33:
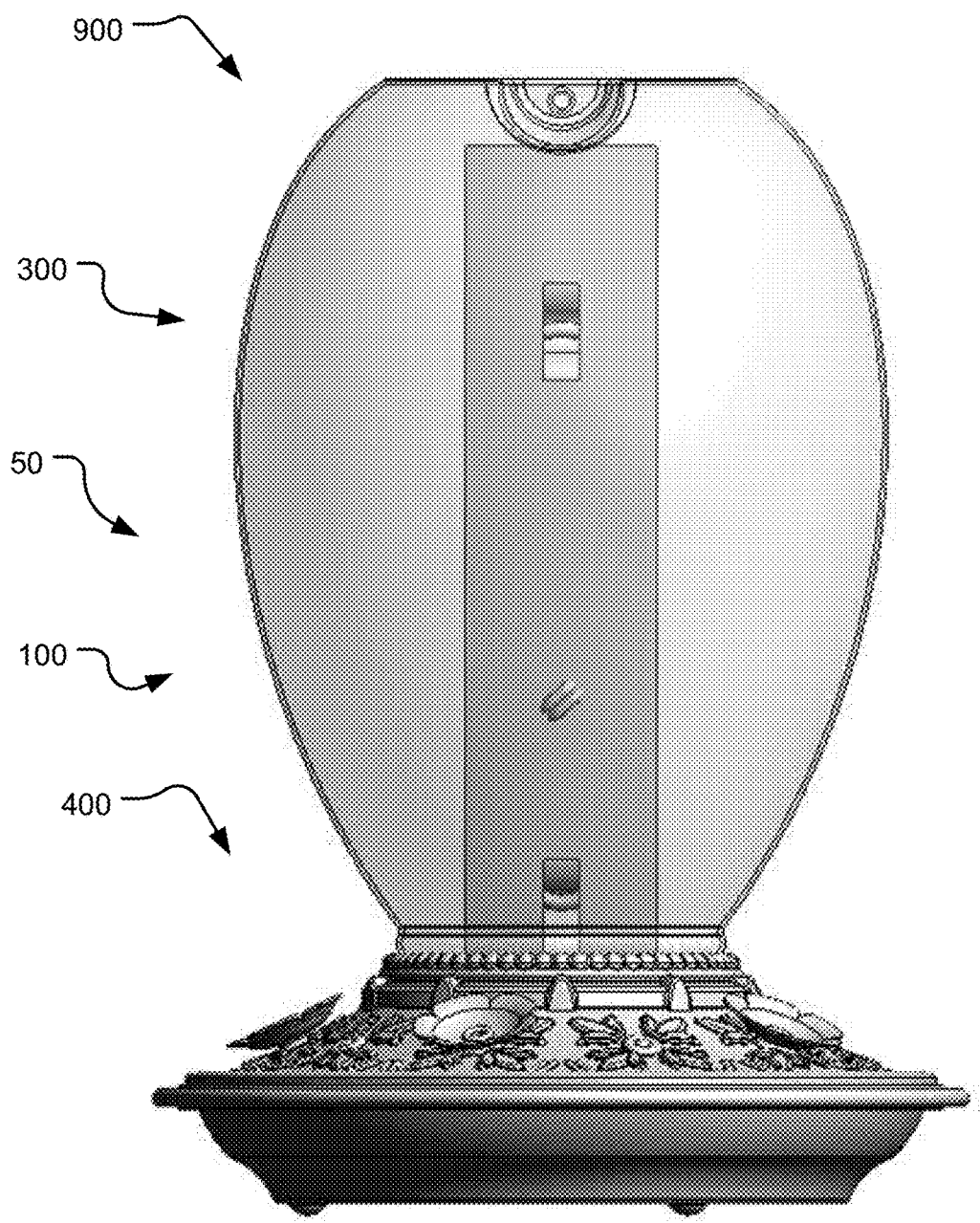
FIG. 33 is a back view of the bird feeder of FIG. 30.
Figure 34:
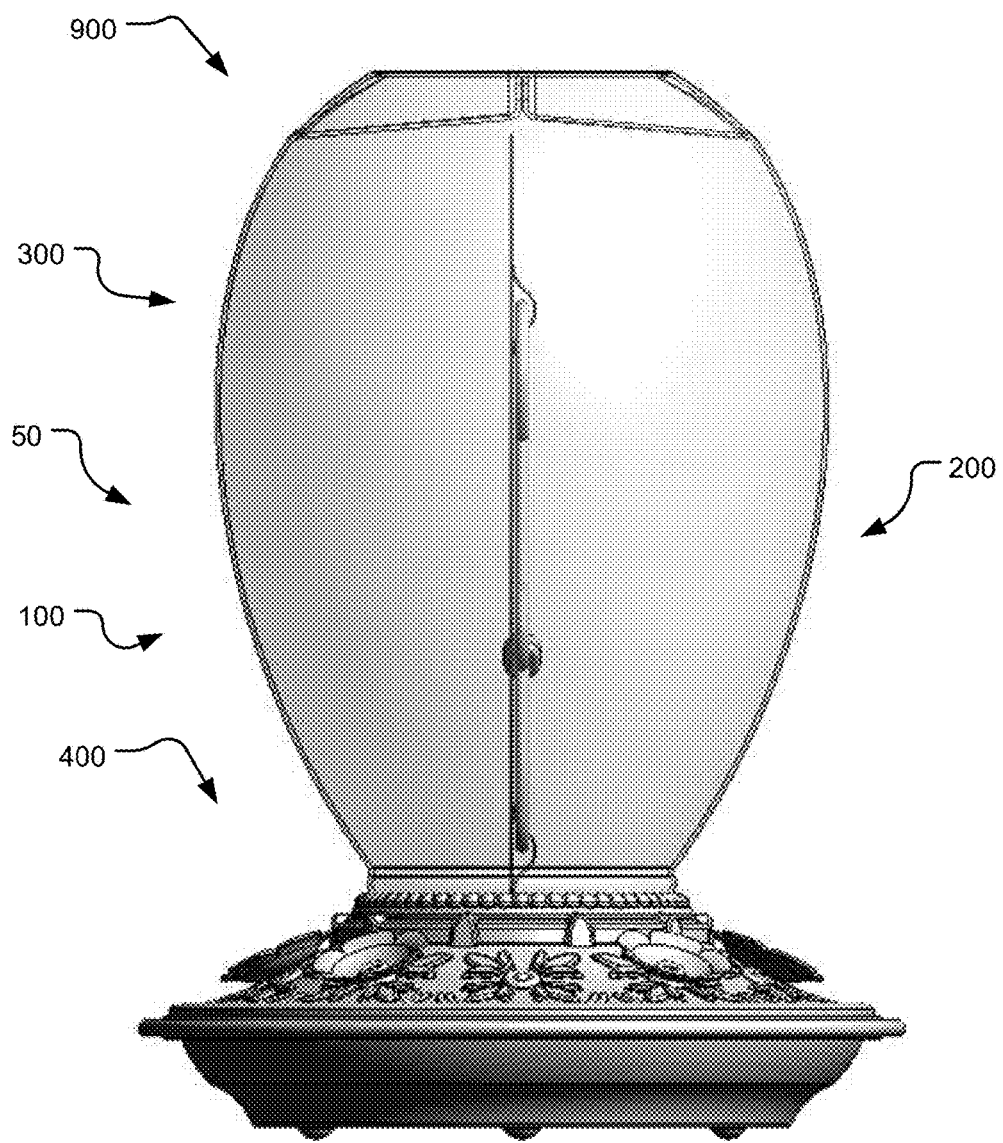
FIG. 34 illustrates a left side view of the bird feeder of FIG. 30.
Figure 35:
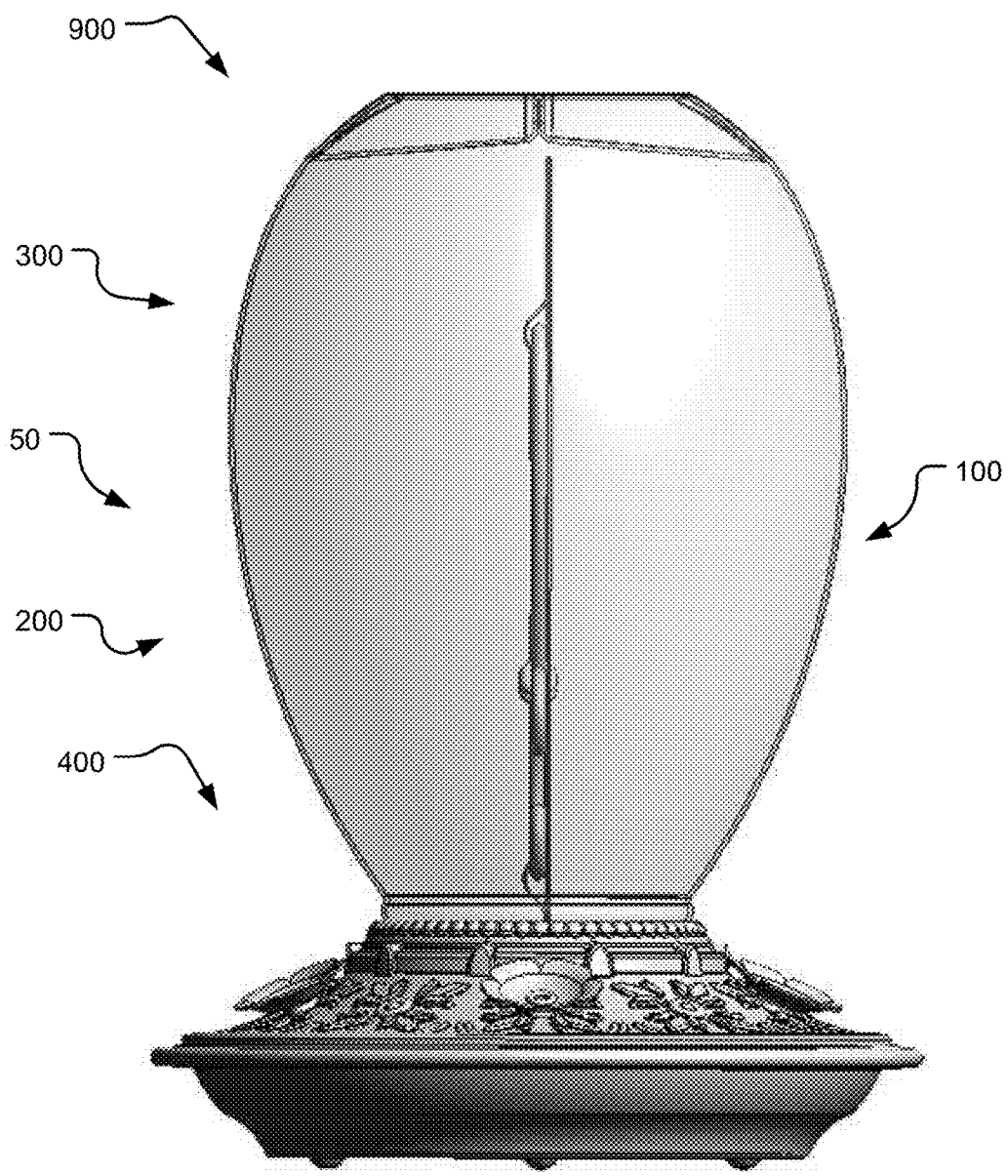
FIG. 35 shows a right side view of the bird feeder of FIG. 30.
Figure 36:
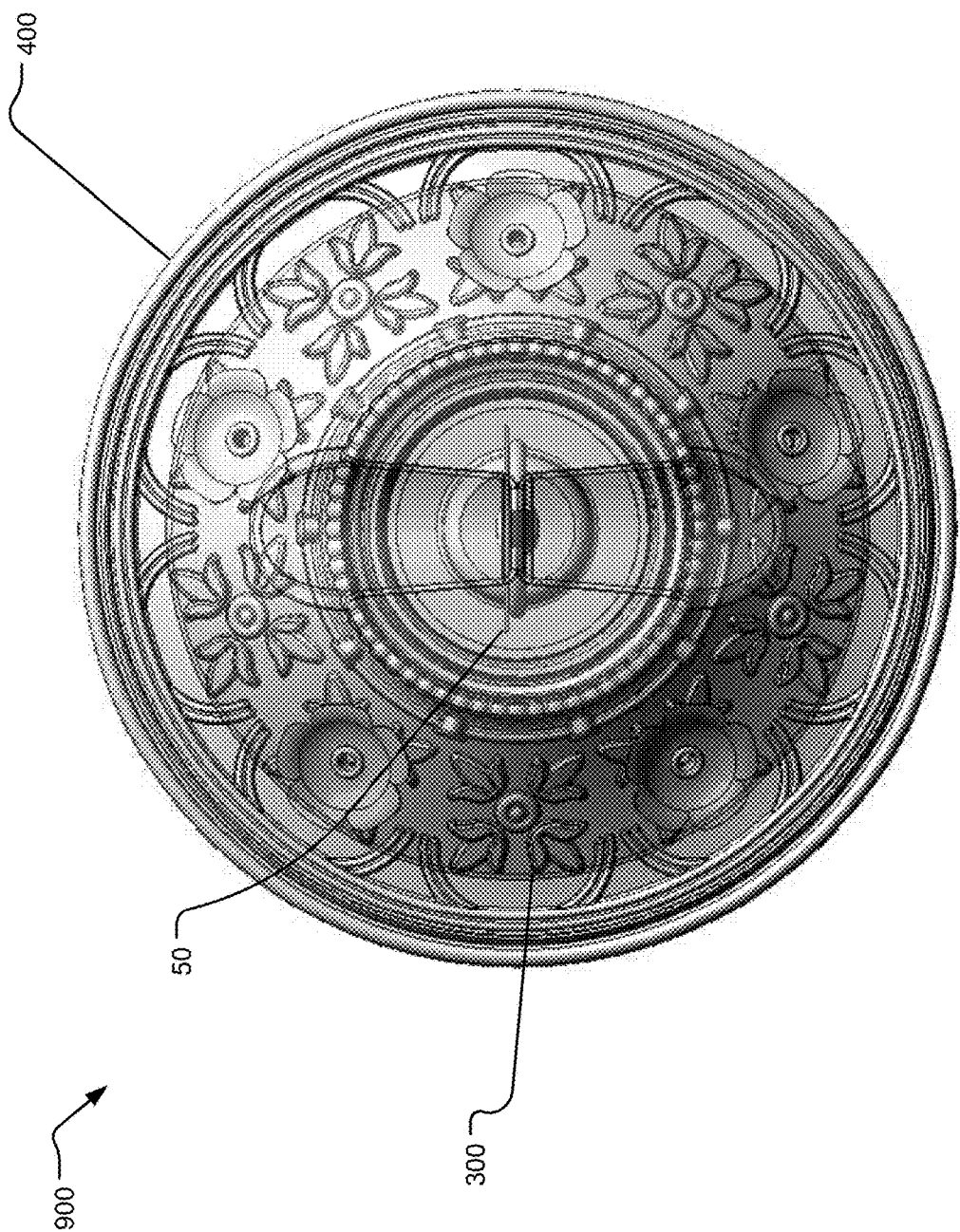
FIG. 36 is a top view of the bird feeder of FIG. 30.
Figure 37:
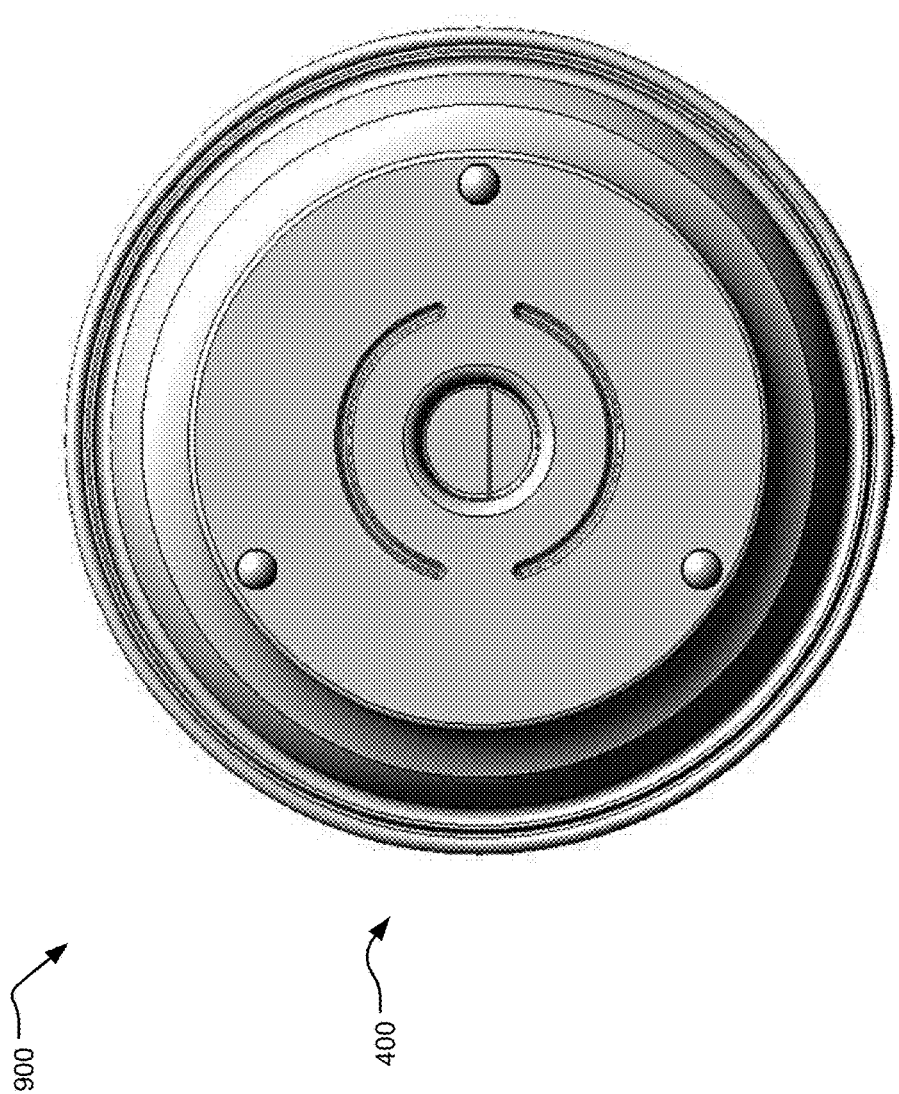
FIG. 37 is a bottom view of the bird feeder of FIG. 30.
Figure 38:
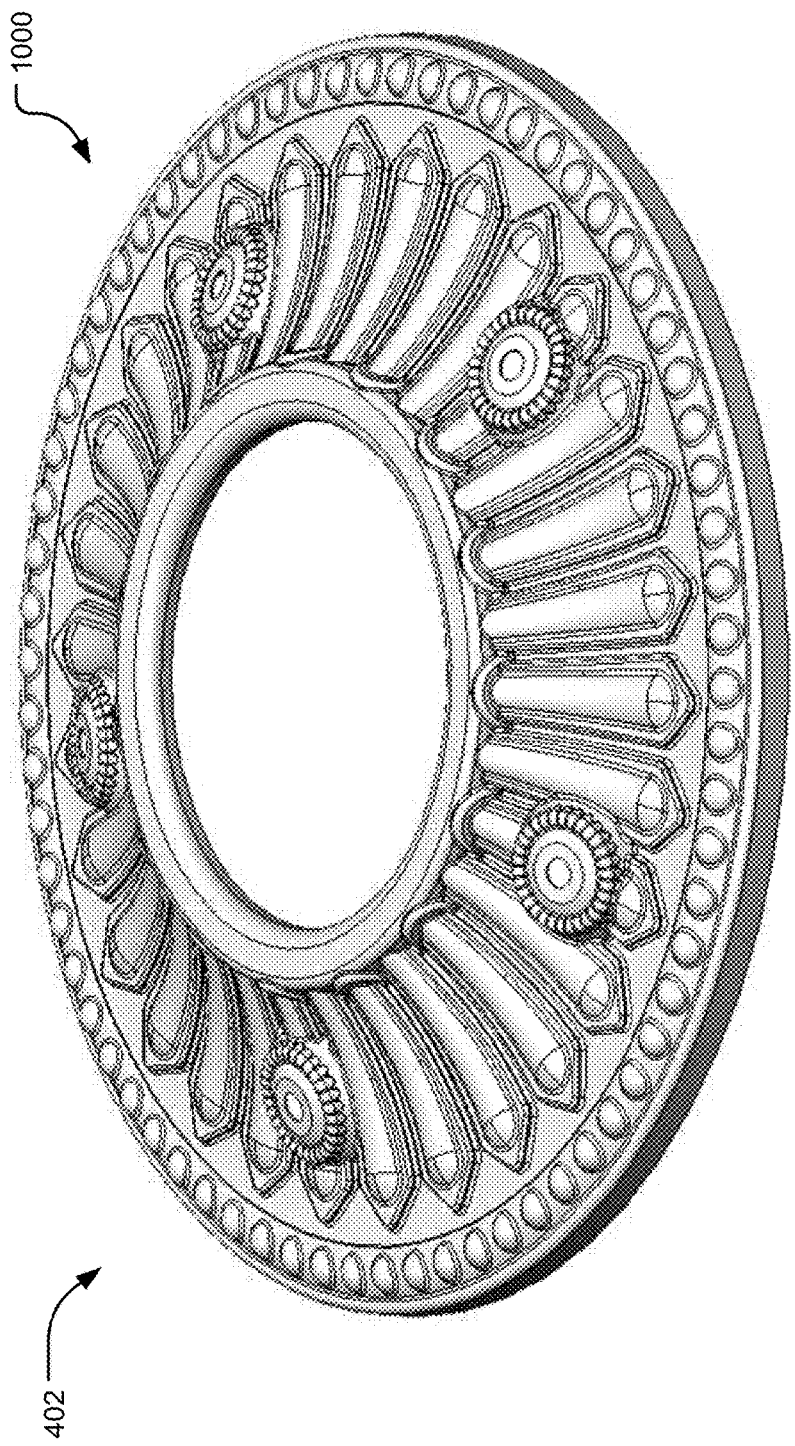
FIGS. 38 and 39 are an isometric view and a top view, respectively, of an example basin top.
Figure 39:
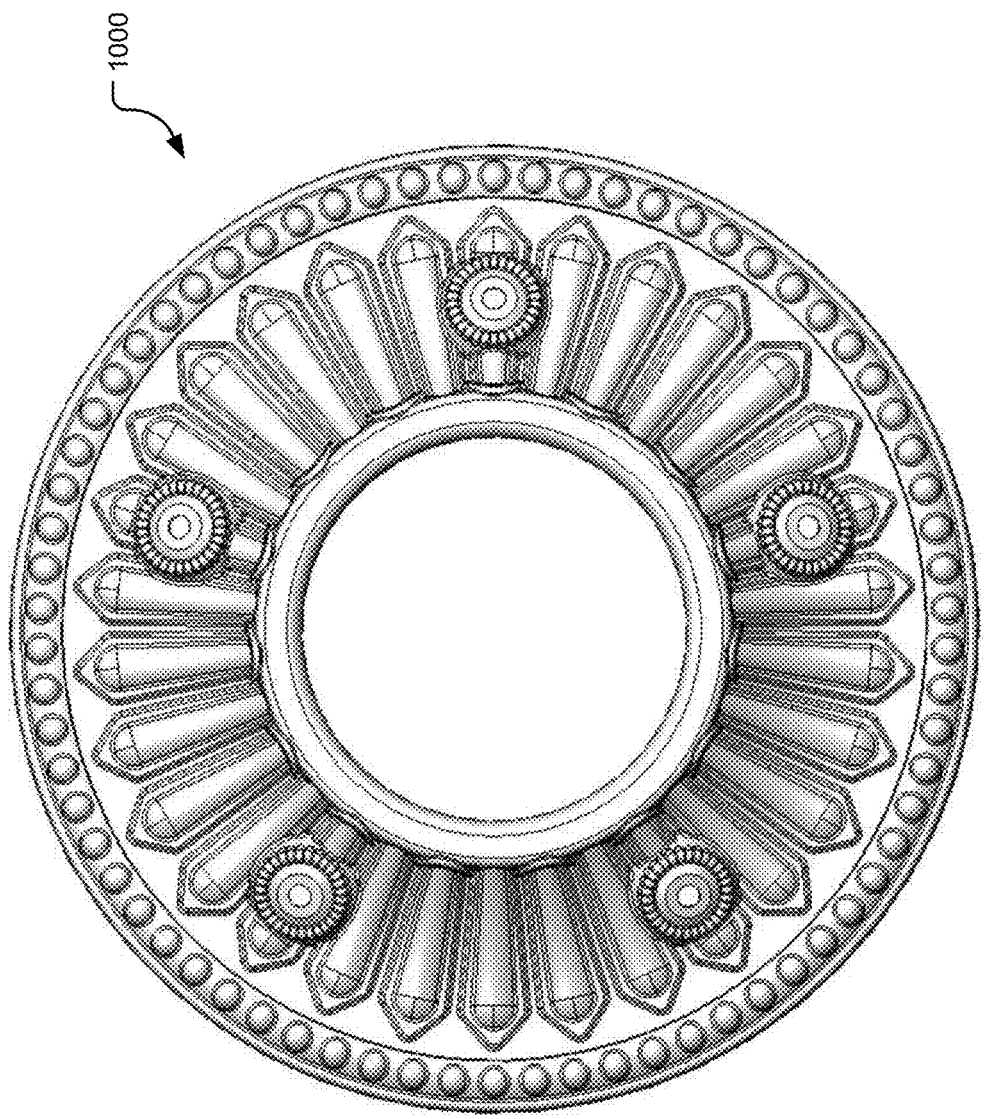
Figure 40:
FIGS. 40 and 41 are an isometric view and a top view, respectively, of another example basin top.
Figure 41:
Figure 42:
FIGS. 42 and 43 are an isometric view and a top view, respectively, of another example basin top.
Figure 43:
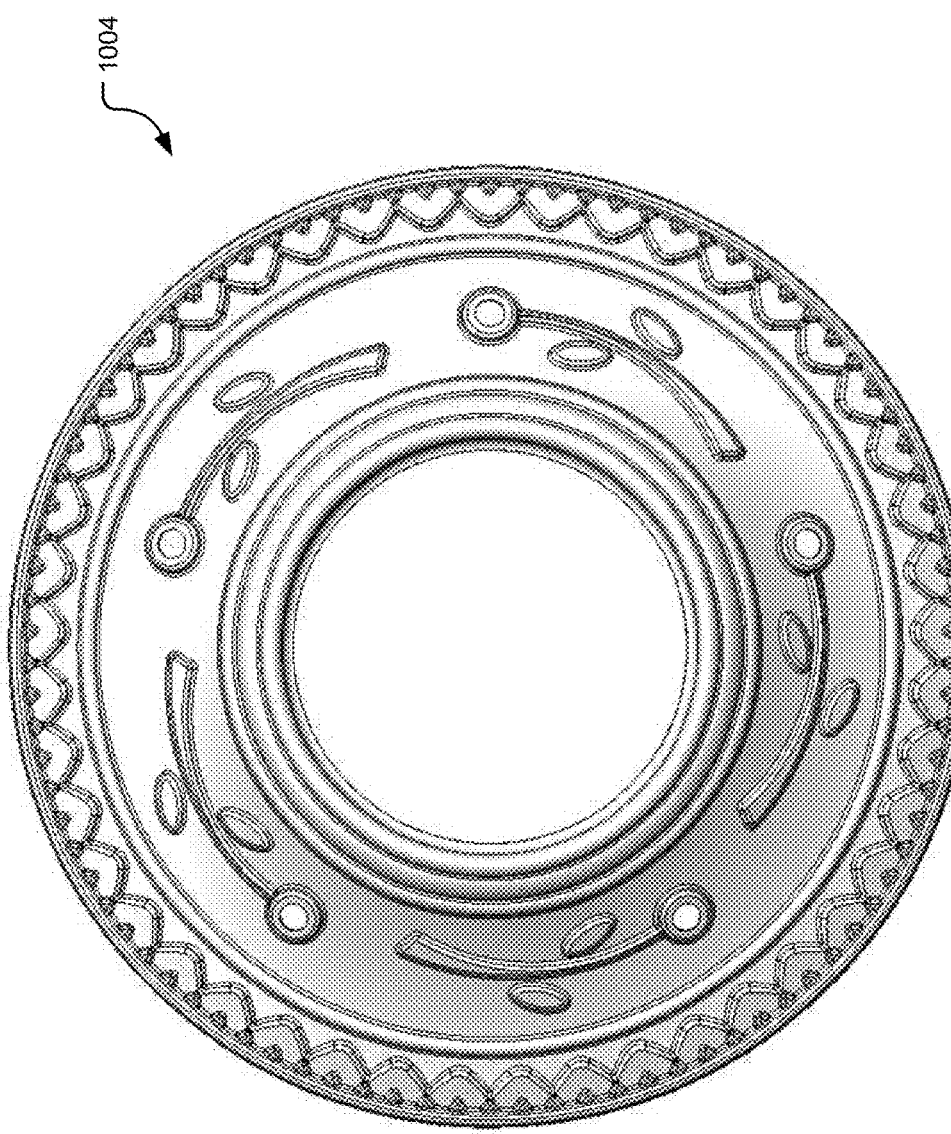
Figure 44:
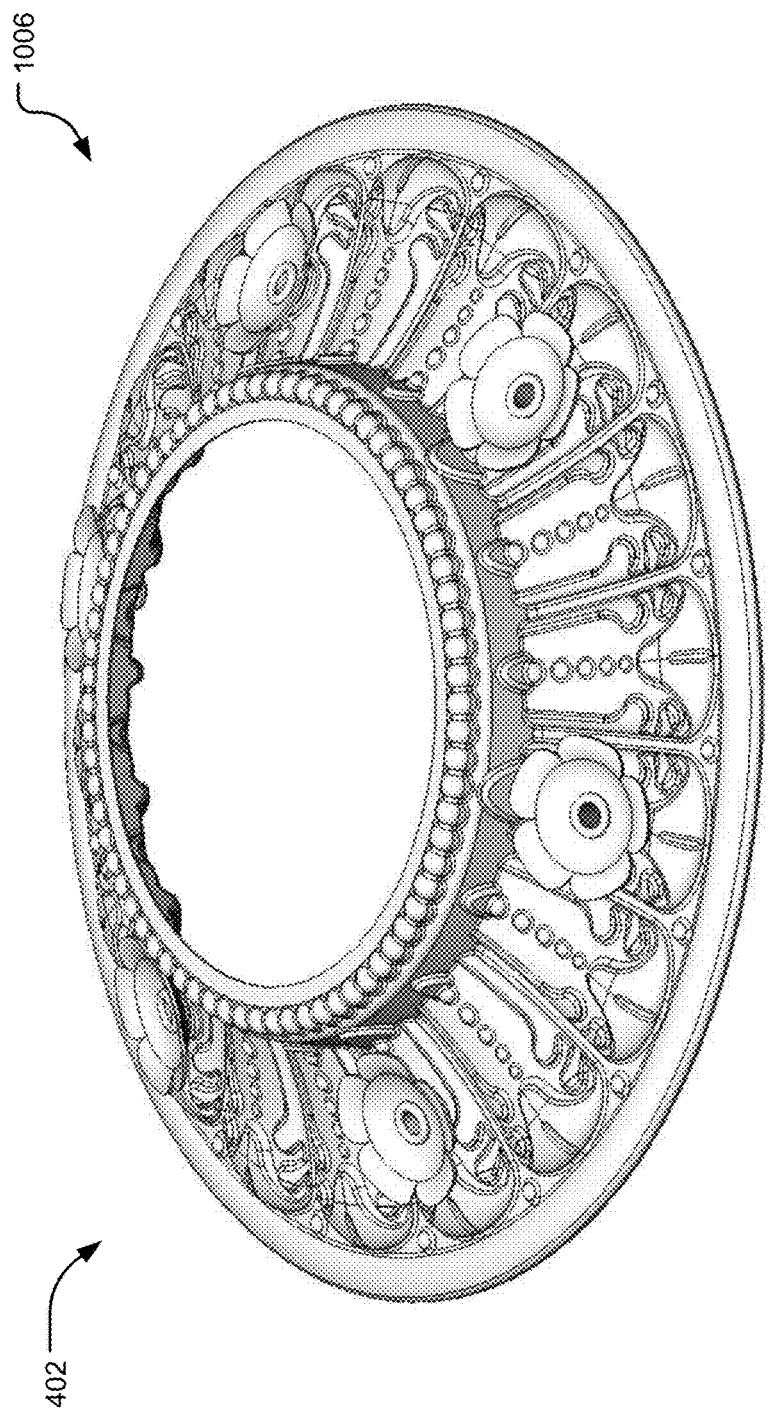
FIGS. 44 and 45 are an isometric view and a top view, respectively, of another example basin top.
Figure 45:
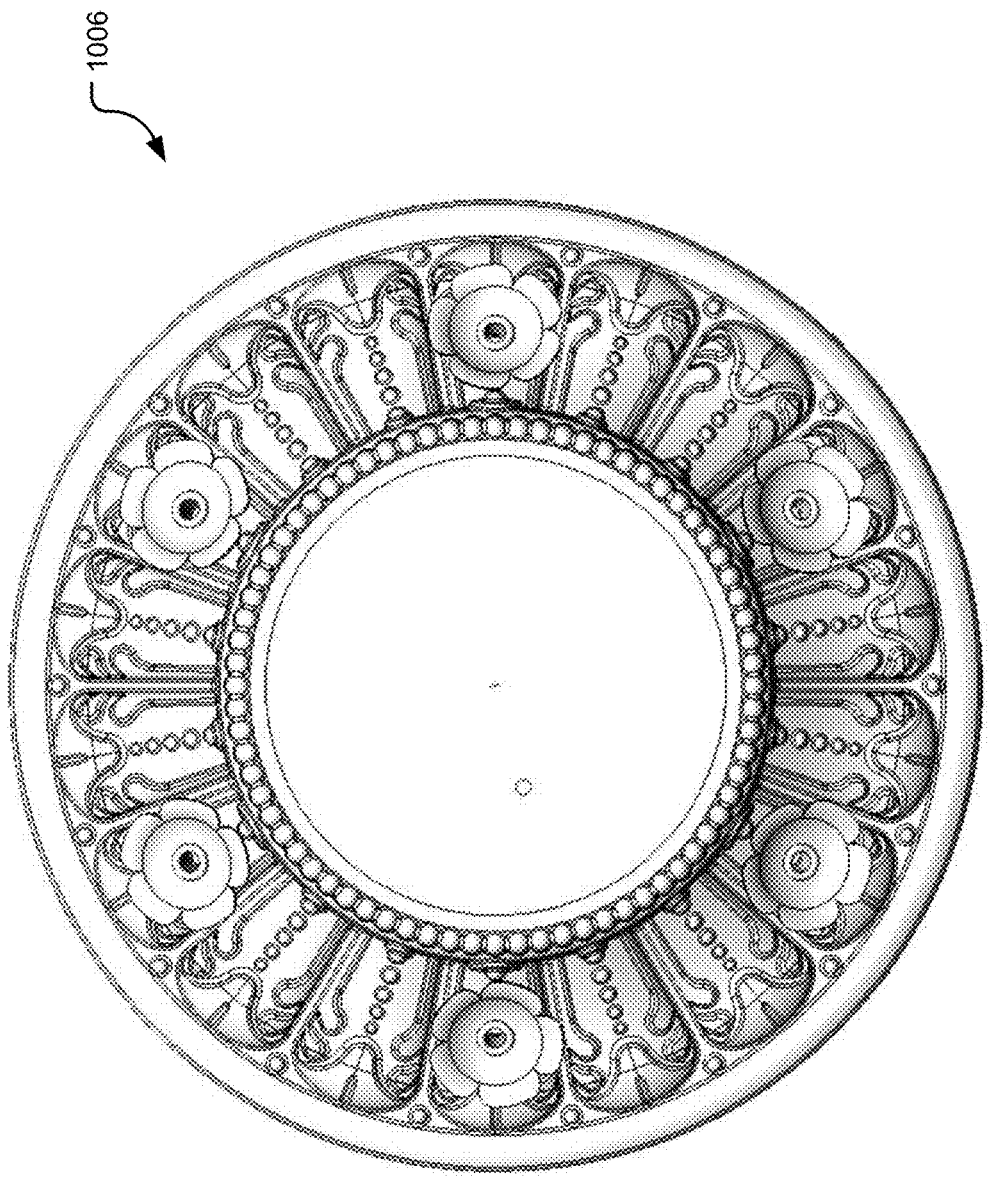
Figure 46:
FIGS. 46 and 47 are an isometric view and a top view, respectively, of another example basin top.
Figure 47:
Figure 48:
FIGS. 48 and 49 are an isometric view and a top view, respectively, of another example basin top.
Figure 49:
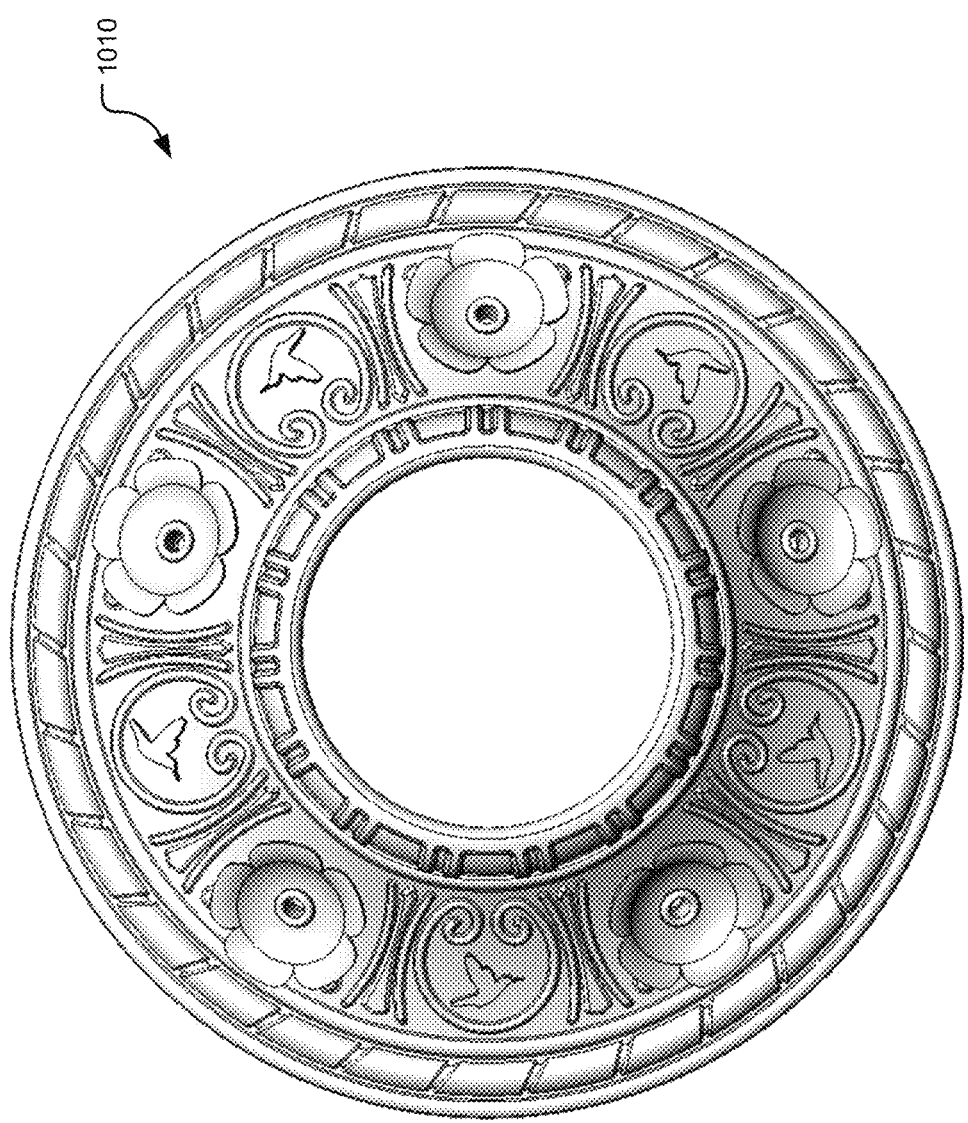

As shown in FIG. 6, for example, a cap 500 is configured to engage the proximal end of the bottle 300. In one implementation, the cap 500 includes a cap hanger 502 configured to engage the hanger 200 to suspend the bird feeder. The cap 500 may be substantially similar to or otherwise include one or more features of the various bird feeder hanger assemblies described in U.S. patent application Ser. No. 14/531,925, entitled "Bird Feeder Hanger Assembly" and filed on Nov. 3, 2014, which is specifically incorporated by reference herein in its entirety.

Turning to FIGS. 6-37, various examples of bird feeders 600-900 having the hanger display 50 are shown. Referring first to FIGS. 6-13, a first example of a bird feeder 600 is shown. The bottle body 302 of the bird feeder 600 has a pinched waist, and the basin 400 includes a first design of stamped material. Turning to FIGS. 14-21, another example of a bird feeder 700 is shown. The bottle body 302 of the bird feeder 600 tapers distally, and the basin 400 includes a another design of stamped material. As shown in FIGS. 22-29, another example of a bird feeder 800 is shown. The bottle body 302 of the bird feeder 700 is similar to the shape of bird feeder 700, and the basin 400 includes another design of stamped material. Turning to FIGS. 30-37, another example of a bird feeder 900 is shown. The bottle body 302 of the bird feeder 900 is rounded and includes an engaging features to engage the hanger 200 without the cap 500. The bird feeder 900 includes the basin 400 with another design of stamped material. FIGS. 38-49 show various examples 1000-1010 of basin tops 402. It will be appreciated that all the example bird feeders 600-900 and basin top examples 1000-1010 are exemplary only and not intended to be limiting.

In the present disclosure, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A bird feeder comprising:
   a bottle having a transparent, elongated body extending from a proximal end to a distal end, the proximal end attached to a cap and the distal end attached to a basin, the bottle having an interior configured to hold bird food;

a display insert inserted through an opening in the bottle, the display insert sized and configured to extend along a length of the bottle in the interior from the cap to the basin, the display insert having a rigid, planar surface with a proximal tab and a distal tab defined therein; and a hanger having a proximal hook and a distal hook, the proximal hook engaged the proximal tab and the distal hook engaged the distal tab to display the hanger through the transparent, elongated body of the bottle.

2. The bird feeder of claim 1, wherein the display insert is rectangular in shape.

3. The bird feeder of claim 1, wherein the display insert is made from at least one of: plastic, metal, ceramic, or wood.

4. The bird feeder of claim 1, wherein the display insert is transparent.

5. The bird feeder of claim 1, wherein the basin includes a top and a bottom.

6. The bird feeder of claim 5, wherein the top of the basin is made from a stamped material.

7. The bird feeder of claim 5, wherein the bottom includes a protrusion, the display insert configured to rest on the protrusion.

8. The bird feeder of claim 1, wherein the hanger includes at least one curved wire.

9. The bird feeder of claim 1, further comprising:
a plurality of ports positioned on the basin.

* * * * *